(12) United States Patent
Banister

(10) Patent No.: US 7,180,956 B1
(45) Date of Patent: Feb. 20, 2007

(54) METHOD AND APPARATUS FOR APPLYING OVERLAID PERTURBATION VECTORS FOR GRADIENT FEEDBACK TRANSMIT ANTENNA ARRAY ADAPTATION

(75) Inventor: Brian C. Banister, San Diego, CA (US)

(73) Assignee: Via Telecom Co., Ltd., Grand Cayman (KN)

( * ) Notice: Subject to any disclaimer, the term of this patent is extended or adjusted under 35 U.S.C. 154(b) by 774 days.

(21) Appl. No.: 10/076,925

(22) Filed: Feb. 14, 2002

Related U.S. Application Data

(63) Continuation-in-part of application No. 09/632,081, filed on Aug. 2, 2000, application No. 10/076,925.

(60) Provisional application No. 60/278,501, filed on Mar. 23, 2001.

(51) Int. Cl.
*H04B 7/02* (2006.01)
*H04L 1/02* (2006.01)

(52) U.S. Cl. .................. 375/267; 375/347; 455/101; 455/552.1; 455/562.1

(58) Field of Classification Search .............. 375/267, 375/299, 259, 260, 295, 304, 144, 275, 280, 375/281, 284, 285, 347, 146, 149, 348, 349; 370/310; 455/522.1, 562.1, 101
See application file for complete search history.

(56) References Cited

U.S. PATENT DOCUMENTS 6,141,567 A * 10/2000 Youssefmir et al. ..... 455/562.1
6,434,366 B1 * 8/2002 Harrison et al. .......... 455/69
6,473,467 B1 * 10/2002 Wallace et al. .......... 375/267

OTHER PUBLICATIONS

Gerlach, D. Paulraj, A, "Adaptive Transmitting Antenna Arrays With Feedbacb", IEEE 1994. pp. 150-152.*

(Continued)

*Primary Examiner*—Mohammed Ghayour
*Assistant Examiner*—Qutub Ghulamali
(74) *Attorney, Agent, or Firm*—Jaquez & Associates; Martin J. Jaquez, Esq.

(57) ABSTRACT

A novel method and apparatus for applying overlaid perturbation vectors for gradient feedback transmit antenna array adaptation is disclosed. The method and apparatus of the present invention allows a communication system to reduce transmit power that is associated with dedicated pilot signals by overlaying perturbation vectors and measuring channel estimates and demodulation channel estimates during a measurement time interval that comprises a plurality of feedback time intervals. The present inventive method utilizes channel estimates that include the effects of previous perturbation vectors, subsequent feedback vectors and intermediate feedback decisions. The inventive method extracts a coarse gradient estimate by utilizing a continuous summation of overlaid weight vector perturbation vectors and updates the weighting vector accordingly.

20 Claims, 11 Drawing Sheets

OTHER PUBLICATIONS

Jen-Wei Liang Forward Link Antenna Diversity Using Feedback for Indoor Communication Systems, IEEE Sep. 1995, pp. 1753-1755.*

Gerlach, D. Paulraj, A, Adaptive transmitting Antenna Methods for Multipath Environments, IEEE, GLOBECOM '94. pp. 425-429 vol. 1.*

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

Banister, et al. "A Stochastic Gradient Algorithm for Transmit Antenna Weight Adaptation with Feedback", IEEE, 2001, pp. 314-317.

Harrison, et al. (Motorola) "Open and Closed Loop Transmit Diversity at High Data Rates on 2 and 4 Elements", document #C30-199990817-017, submitted to 3GPP2 Aug. 16-20, 1999, pp. 1-5.

Banister, et al. "Tracking Performance of a Stochastic Gradient Algorithm for Transmit Antenna Weight Adaptation with Feedback", IEEE, published May 2001, pp. 2965-2968.

Liang, et al., "Transmit Antenna Array Techniques for Cellular CDMA Systems", IEEE, published Sep. 1998, pp. 1396-1400.

Liang, et al., "Forward Link Antenna Diversity Using Feedback for Indoor Communication Systems", IEEE, published May 1995, pp. 1753-1755.

* cited by examiner

METHOD AND APPARATUS FOR APPLYING OVERLAID PERTURBATION VECTORS FOR GRADIENT FEEDBACK TRANSMIT ANTENNA ARRAY ADAPTATION

CROSS-REFERENCE TO RELATED APPLICATIONS

This application is a continuation-in-part of U.S. application Ser. No. 09/632,081, filed Aug. 2, 2000, entitled "Adaptive Antenna Method and Apparatus", hereby incorporated by reference herein for its teachings on digital communication systems. This application claims the benefit of the priority filing date of U.S. application Ser. No. 09/632,081 in accordance with 35 USC § 120. This application is related to and also claims the benefit of U.S. Provisional Application No. 60/278,501, filed Mar. 23, 2001, entitled "Adaptive Antenna System and Method".

BACKGROUND OF THE INVENTION

1. Field of the Invention

This invention relates to digital wireless communication systems, and more particularly to methods for applying overlaid perturbation vectors for gradient feedback transmit antenna array adaptation.

2. Description of Related Art

Digital wireless systems presently being deployed are commonly seen to be forward link (i.e., base station ("BS")-to-mobile station ("MS")) capacity limited. This is mostly due to asymmetric traffic scenarios: most data applications, such as web browsing, are envisioned to be sending relatively large quantities of data to the mobile user on the forward link, while the reverse link may contain only small control packets (i.e., a new IP address to download) so that the forward data rate is much greater than the reverse data rate.

Forward capacity can be increased with an array of antennae in a base station whose individual carrier amplitudes and phases can be adjusted based on feedback from a MS. In particular, a transmit adaptive antenna (TxAA) algorithm will typically transmit the same MS-specific waveform on multiple antennae, applying adaptive complex weights to the baseband signal applied to each antenna. To allow the MS to perform coherent demodulation, a dedicated pilot channel is typically transmitted in the same manner as the data.

While receive adaptive antenna (RxAA) algorithms at the BS are fairly straight forward, TxAA algorithms are not. The mere definition of an "optimal" TxAA algorithm is not unambiguous as the optimization of one mobile's forward link can degrade another's, leading to complex tradeoffs which are not part of the RxAA problem.

Most TxAA algorithms will require some a priori knowledge of the transmission channel from the BS to the MS. Given this knowledge and a defined "optimality" criterion, the BS can determine the TxAA weights. The difficulty is that, although the MS can measure the channel, it is the BS which needs the measured information to adjust its transmit weights. Also, there can be some additional complexity in that the MS must generally measure the channel of each transmit antenna separately, in addition to measuring the channel of the overall transmit (Tx) weight-adjusted signal. The latter measurement is required for the demodulation of the signal.

A number of methods for implementing TxAA algorithms have been proposed. According to some of these proposals, a few bits are allocated to the MS to encode the channel gain and phase. See, for example, Thomas Derryberry, Balaji Raghothaman (Nokia) "Transmit Adaptive Arrays without User Specific Pilot", document #C30-19990817-030, submitted to 3GPP2 August 1999; Mark Harrison (Motorola) "Tx AA Parameter Recommendations", document #C30-19990914-010, submitted to 3GPP2, Tokyo Japan, September 1999; and Mark Harrison, Kiran Kuchi (Motorola) "Open and closed loop transmit diversity at high data rates on 2 and 4 elements", document #C30-19990817-17, submitted to 3GPP2 August 1999. These methods do not allow the desired antenna weights to be precisely determined because the channel state must be distorted in order to be fed back to the BS with a low bit rate.

Typically, the academic literature has assumed that the full channel information is available at the transmitter, which is not a practical assumption. See, e.g., Jen-Wei Liang, Arogyaswami Paulraj "Forward link antenna diversity using feedback for indoor communication systems" Proceedings, 1995 International Conference on Acoustics, Speech, and Signal Processing, May 1995; Farrokh Rashid-Farrokhi, K. J. Ray Liu, Leandros Tassiulas "Transmit beamforming and power control for cellular wireless systems" IEEE Journal on Selected Areas in Communications, Vol. 16, No. 8, October 1998. There have been several submissions to the TIA standardization body for TxAA algorithms with channel feedback from MS to BS, some of which are referenced above. All of these submissions require that the MS measures a primary and secondary pilot transmitted from the primary and secondary antennae. Some submissions have shown that 4 antenna transmission can yield improved performance, however, with no recognition of the increased complexity at the MS.

The use of a few bits of channel feedback leads to substantial degradation relative to possible performance, because the feedback requires low bit rate quantization. Also, the MS must individually measure and transmit information for each antenna; the MS requires extra hardware to perform these functions. Furthermore, the above-described methods do not gracefully grow to accommodate an increase in the number of antennae.

The above-mentioned systems are illustrated in FIGS. 1–3, which illustrate a CDMA system. FIG. 1 shows a transmitter 10 with two antennae, a first antenna (antenna #0) 12 and a second antenna 14 (antenna #1). As is shown, different common pilot signals are associated with different antennae. For each user, such as user #0 and user #1, the transmitter 10 includes an adder, e.g., the adders, 16 and 18 respectively, that adds together a dedicated pilot signal for the user and the forward traffic for that user. For user #0, multipliers 20 and 22 multiply the summed signal with complex weights for the first and second antennae 12 and 14, respectively. For each antenna, the weighted user signals are summed by adders 24 and 26 and the result is added by adders 28 and 30 to the pilot signal for that antenna. It should be noted that FIG. 1 represents a complex baseband equivalent, as no RF modulation stage is shown.

FIGS. 2 and 3 show possible embodiments for receivers that may be used to receive signals transmitted by the transmitter 10. As shown in FIG. 2, three signal components are extracted from the received signal: one signal corresponding to the dedicated channel, one signal corresponding to the common pilot for the first antenna and one signal corresponding to the common pilot for the second antenna. This extraction is accomplished by multipliers 32, 34 and 36 and accumulators 38, 40 and 42. A more hardware efficient embodiment is shown in FIG. 3, which employs multiplexer 44 and demultiplexer 46 to alternately select between the signals for the different transmit antennae. The time-multiplexed processing used by the embodiment of FIG. 3 saves hardware at the expense of 3 dB loss of precision for each channel. This tradeoff may be acceptable when a low bit rate, low precision channel reporting is used by the mobile to report these channel estimates to the BS.

The channel estimate attained by the mobile is coded into a low bit representation.

The bit rates mentioned in the above cited references are 1, 2 or 4 bits (1b phase, 2b phase, or 3b phase+1b amplitude). So, for a forward channel vector c, the mobile generates the estimate ĉ of the channel gain vector, which is then quantized to produce the feedback estimate ĉ.

Note that the MS channel estimation hardware of FIGS. 2 and 3 can be used for an arbitrarily large number of Tx antennae, provided that there are unique pilot codes for each antenna and that the MS has information regarding these codes.

Finally, the proposed systems have the MS report the channel estimate based on 1 "path". In the presence of resolvable multi-path due to delayed reflections of the transmitted waveform, particularly for CDMA, there may be more than one path that is usable to the MS. In order to report the channel for N such paths, the MS-to-BS feedback rate would be required to increase N-fold, and the number of such paths would somehow need to be communicated to the BS. This solution is not practical however, and instead, the MS reports the channel estimate for only the strongest path. This solution discards some useful channel characteristics which could further increase performance under these circumstances.

The algorithm employed by the BS to utilize the received channel information would most likely be a simple matched transmission weighting. That is, the forward weights chosen would be the conjugate of the forward vector channel, so that the weights (applied in conjugate) are determined as follows:

w=ĉ

This formulation attempts to maximize signal power to the mobile without regard to the locations of other mobiles. It does not steer nulls to the other mobiles. The channel estimate from a given mobile could be used to determine transmission nulls of other mobiles, but the coarseness of the channel estimate (no greater than 4 bits) makes this approach ineffective.

Schemes such as that shown in FIGS. 1–3 have significant disadvantages. In particular, as previously mentioned, the use of a few bits of channel feedback requires quantization, which leads to substantial degradation relative to the possible performance. Also, because an MS unit must individually measure and transmit information for each antenna, the MS requires extra hardware to perform these functions. Furthermore, the above-described methods do not grow gracefully in application to more antennae.

One method used by the present invention in implementing a TxAA algorithm (referred to as the "Adaptive Antenna Method and Apparatus") that overcomes these disadvantages is described in the above-incorporated U.S. Provisional Application No. 60/278,501, U.S. application Ser. No. 09/632,081 and hereinbelow. In accordance with this method, a transmitter includes hardware and/or software for adaptively updating weights for a plurality of antennae. In particular, according to this method, the transmitter generates a pair of test weight vectors, each vector comprising a plurality of complex entries, with each entry corresponding to a different one of a plurality of antennae. The first complex weight vector is equal to $$\frac{w_{base} + \beta \cdot v}{\|w_{base} + \beta \cdot v\|}$$

and the second complex weight vector is equal to $$\frac{w_{base} - \beta \cdot v}{\|w_{base} - \beta \cdot v\|}$$

where v is a test perturbation vector comprising a plurality of complex entries, with each entry corresponding to a different one of a plurality of antennae, β is an algorithm constant and $w_{base}$ is a vector that is updated based on feedback received from a receiver. The first and second complex weight vectors are applied to a dedicated pilot signal during alternate time intervals. During each time interval, the average of the first and second complex weight vectors is applied to the data traffic transmitted by the transmitter.

A receiver (e.g., a mobile station or ("MS")) alternately receives the pilot signal as multiplied by the first and second weight vectors as described above. The mobile station determines which of the weighted pilot signals resulted in a stronger signal received at the mobile and, based upon this determination, transmits feedback information. The transmitter receives the feedback and updates the first and second weights accordingly. In particular, if the first weight resulted in a stronger signal, $w_{base}$ is updated to become $$\frac{w_{base} + \beta \cdot v}{\|w_{base} + \beta \cdot v\|}$$

(the previous first weight) whereas if the second weight resulted in a stronger signal, w is updated to become $$\frac{w_{base} - \beta \cdot v}{\|w_{base} - \beta \cdot v\|}$$

(the previous second weight). The above-described process is repeated with the new $w_{base}$. New test vectors v are generated and applied after each MS channel measurement is made.

A disadvantage of the adaptive antenna method and apparatus and the other TxAA techniques described above with reference to FIGS. 1–3 is that these techniques transmit energy from a dedicated pilot signal, which can cause signal degradation or interference. A dedicated pilot signal is defined as a known signal that is transmitted for channel estimation purposes and is utilized by a particular receiving device (e.g., a mobile device). In contrast, non-adaptive communication systems may utilize a common pilot signal that is transmitted to all receiving devices in the communication system. For example, the adaptive antenna method and apparatus applies weight vectors through utilization of a set of perturbation vectors determined during a defined measurement and feedback time interval.

Disadvantageously, TxAA communication systems may cause signal degradation and interference. A typical heuristic feedback rate for a TxAA communication system is at least approximately 20 times the channel variation bandwidth to keep up with the channel variations. In these systems, the channel estimation for TxAA feedback has a bandwidth of at least 20 times the channel variation because the channel estimation utilized to determine the feedback is performed during one feedback interval. Typical adaptive communication systems measure channel estimations for coherent demodulation utilizing an estimation filter having a bandwidth of approximately the channel variation bandwidth. A reduction in estimation noise can be achieved by utilizing a smaller measurement bandwidth, however utilizing a measurement bandwidth that is smaller than the variation bandwidth can obscure the variation. Thus, the channel estimation used for TxAA feedback may have a variance of 20 times the demodulation channel estimate due to the measurement bandwidth being smaller than the variation bandwidth. Therefore, TxAA communication may require increased pilot signal power to support the TxAA feedback channel estimation, which causes increased interference to other users.

A need exists for a method and apparatus for reducing the amount of transmit power or energy that is associated with a dedicated pilot, which supports channel estimation used for TxAA feedback. Such a method should not degrade performance due to quantization from utilizing a few feedback bits. In addition, the method and apparatus should be able to accommodate multiple antennas.

The present invention provides such a method and apparatus for applying overlaid perturbation vectors for gradient feedback transmit antenna array adaptation.

SUMMARY OF THE INVENTION

The present invention is a novel method and apparatus for applying overlaid perturbation vectors for gradient feedback transmit antenna array adaptation. The method and apparatus of the present invention allows a communication system to reduce transmit power that is associated with dedicated pilot signals by overlaying perturbation vectors and measuring channel estimates and demodulation channel estimates during a measurement time interval that comprises a plurality of feedback time intervals. The present inventive method utilizes channel estimates that include the effects of previous perturbation vectors, subsequent feedback vectors and intermediate feedback decisions. The inventive method extracts a coarse gradient estimate by utilizing a continuous summation of overlaid weight vector perturbation (OWVP) vectors and updates the weighting vector accordingly. In accordance with the present invention, receivers measure continuous summations of OWVP vectors.

The method and apparatus of the present invention improves the performance in a wireless communication system by reducing signal degradation and interference. Specifically, the present inventive method reduces the amount of transmit power or energy that is associated with a dedicated pilot of a communication system.

Several embodiments of the present invention are described hereinbelow. For example, one embodiment of the present inventive method utilizes the Transmit Adaptive Antenna Weighting Embodiment described above as the feedback algorithm and a sliding window filter that is capable of measuring a continuous summation of OWVP vectors. Another embodiment of the technique utilizes multi-bit feedback with multiple simultaneous perturbation vectors.

The details of the embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Figure 1:
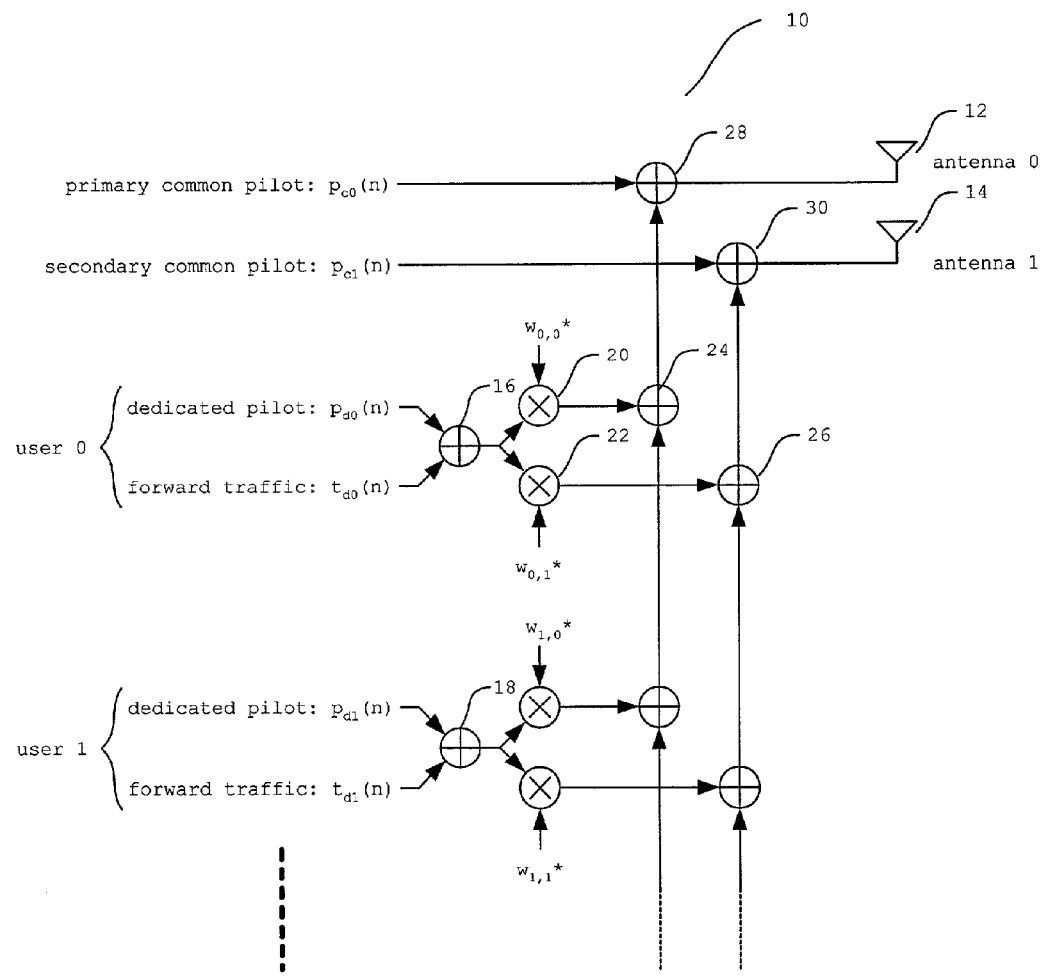
FIG. 1 is a simplified block diagram of one type of conventional two-antenna transmitter that employs antenna weighting derived from receiver feedback
Figure 2:
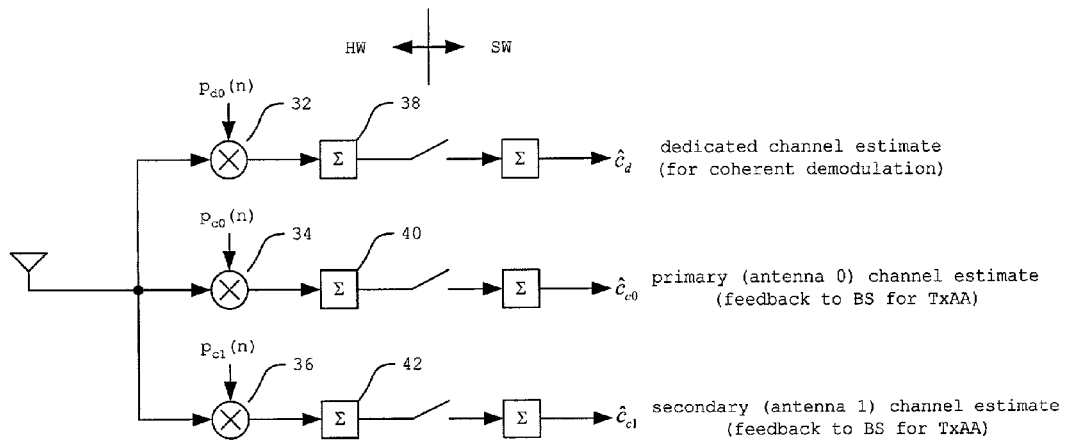
FIG. 2 is a simplified block diagram of a first type of conventional receiver that estimates the channel for each transmit antenna individually.
Figure 3:
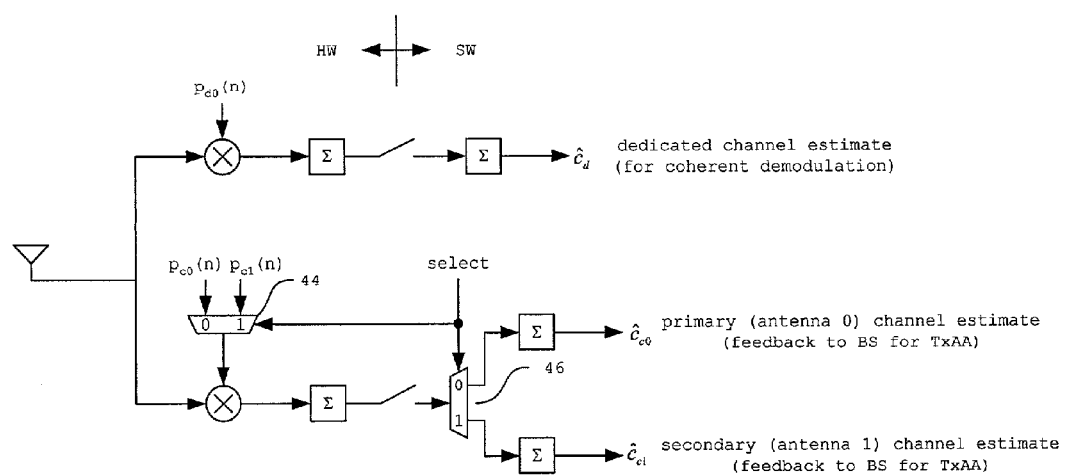
FIG. 3 is a simplified block diagram of a second type of conventional receiver that estimates the channel for each transmit antenna individually.

Throughout this description, the preferred embodiment and examples shown should be considered as exemplars, rather than as limitations on the present invention.

The method and apparatus of the present invention reduces signal interference in a wireless communication system. The present invention reduces the amount of transmit power or energy that is associated with a dedicated pilot of a communication system. Specifically, the present invention is a method and apparatus for applying overlaid perturbation vectors for gradient feedback transmit antenna array adaptation. The present invention selects or determines perturbation vectors based on channel estimates that are measured during a measurement time interval that comprises a plurality of feedback intervals. Thus, perturbation vectors are overlaid or include the effects of previous perturbation vectors, subsequent feedback vectors and intermediate feedback decisions. The present invention is particularly well suited for communication systems that utilize transmit adaptive antenna techniques.

The present inventive method and apparatus is primarily intended for use in digital wireless communication systems. An exemplary DS-CDMA communication system adapted for use in the present generating transmit adaptive antenna weights using binary gradient feedback method and apparatus is described. However, as those of ordinary skill in the art shall recognize, any convenient wireless communication system can be used to practice the present invention. The communication system should allow the mobile station the capability of measuring radio frequency signal strengths and providing binary feedback to the base station. The present invention can be used in any wireless communication system where decreasing interference is desirable.

The following table defines some terms used throughout this description of the invention.

Nomenclature:

Vector and matrix variables are denoted in bold, in contrast to scalars, which are not in bold.

Superscript "T" represents matrix or vector transposition.

Superscript "H" represents matrix or vector hermitian transpose (or conjugate transpose)

| Term | Definition of Term |
| --- | --- |
| AA | Adaptive antenna, more generally adaptive antenna algorithm. |
| BS | Base Station, fixed station which communicates with multiple mobile stations and provides their gateway to the fixed network. |
| CDMA | Code Division Multiple Access. |
| DS-CDMA | Direct Sequence CDMA. |
| Forward link | Radio link from the transmitting base station to the receiving mobile station. |
| HW | Hardware, referring to the fixed digital logic portion of a modem (as opposed to SW). |
| MS | Mobile Station, a user of the cellular network, e.g. a cell phone or a wireless data terminal. |
| pilot | A known signal or "training sequence" transmitted so that the receiver may use it to estimate the channel response. |
| reverse link | Radio link from the transmitting mobile station to the receiving base station. |
| Rx | Receive. |
| SW | Software, typically to distinguish the (modifiable) SW portion of a modem from the HW. |
| Tx | Transmit. |

Transmit Adaptive Antenna Weighting Embodiment

For clarity purposes, certain non-essential assumptions are made in the present detailed description. First, the wireless communication system described is assumed to be a DS-CDMA (Direct Sequence, Code Division Multiple Access) system that uses "pilots" (or "pilot channels") for use in performing coherent demodulation. In fact, most modern digital wireless systems include a pilot channel (sometimes known as a "training sequence", when the pilot channel is time multiplexed, rather than code multiplexed) which is used for channel estimation. Any such system can be used in practicing the present invention.

Second, the below described adaptive array transmitter is considered to exist in a base station and the receiver is a mobile station. This applies to cellular communication applications. In one embodiment, the mobile station may also have a transmit array operating in the same manner. Alternatively, the system that uses the present inventive method and apparatus may not be a cellular system, but rather, it may be a peer-to-peer communication system such as those defined by the Bluetooth™ Specification.

The invention as described can be applied without regard to how many antennae the transmitting BS is using, and in particular the MS does not need knowledge of the number of antennae being used.

Figure 4:
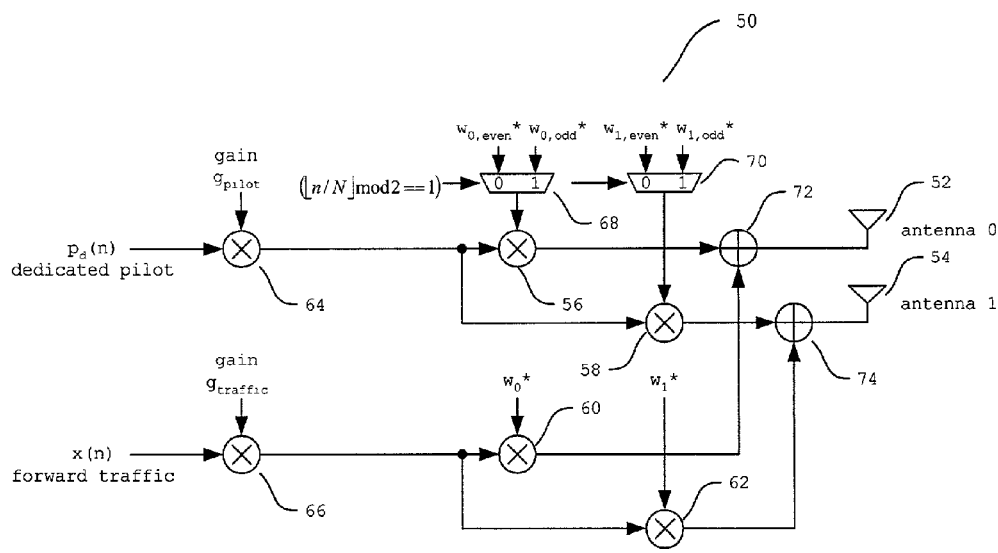
FIG. 4 is a simplified block diagram of one embodiment of a transmitter constructed according to the present invention.

FIG. 4 is a simplified block diagram of a BS transmitter 50 according to one possible embodiment of the present invention. For ease of illustration, two antennae, a first antenna 52 and a second antenna 54 are shown, but it will be appreciated that the present invention may easily be scaled to any number of antennae. Also for ease of illustration, although BS hardware corresponding to one mobile unit is shown, the transmitter 50 will typically have analogous hardware for a number of other users.

As shown in FIG. 4, the transmitter 50 comprises a plurality of multipliers 56, 58, 60, 62, 64 and 66, summers 72 and 74, and multiplexers 68 and 70. Multipliers 64 and 66 multiply a dedicated pilot signal and a forward traffic signal, respectively, with corresponding gains (real valued). Multipliers 60 and 62 multiply the forward traffic signal by weights from the weight vector w, $w_0$ and $w_1$, where $w_0$ is the weight for the first antenna 52 and $w_1$ is the weight for the second antenna 54. The weight values are described below in more detail. $w_{0,odd}$ and $w_{0,even}$, weights from the weight vectors $w_{odd}$ and $w_{even}$, respectively, are provided as inputs to the multiplexer 68, which alternates between them. Similarly, $w_{1,odd}$ and $w_{1,even}$ weights are provided as inputs to the multiplexer 70, which alternates between them. The weighted traffic and pilot signals are summed by the summers 72 and 74 and transmitted by the first antenna 52 and the second antenna 54, respectively. The mathematical representation of the waveform transmitted by the antennae 52 and 54 is described below in more detail.

Figure 5:
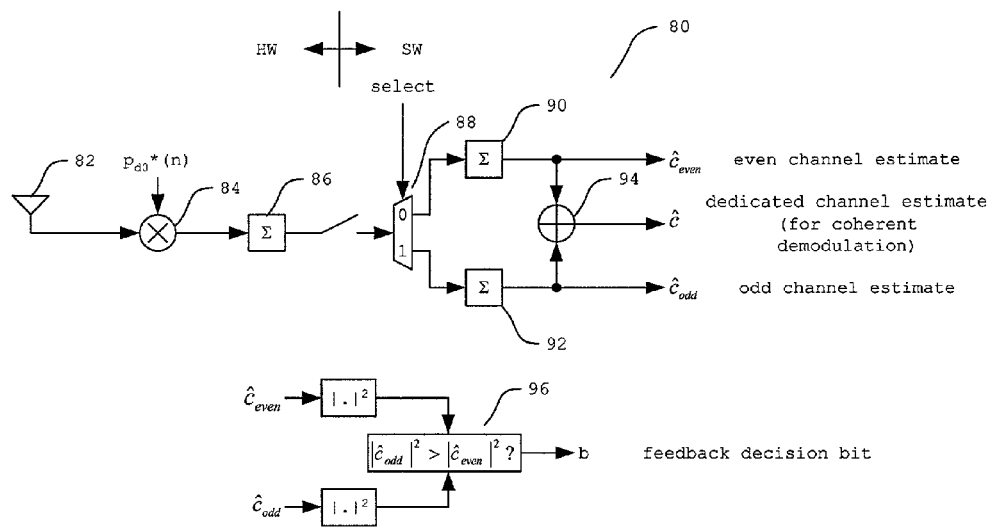
FIG. 5 is a simplified block diagram of one embodiment of a receiver constructed according to the present invention.

FIG. 5 is a simplified block diagram of an MS receiver 80 according to one possible embodiment of the present invention which demonstrates the principle of the feedback decision made by the MS. The receiver 80 comprises an antenna 82, a multiplier 84, and an accumulator 86. The receiver 80 further comprises a demultiplexer 88, accumulators 90 and 92 and a summer 94, which are preferably implemented in software. Signals received by the antenna 82 are multiplied by a pilot despreading code, as is well known in DS-CDMA systems, and the result is passed to accumulator 86, which accumulates a symbol from the chips it receives. "Even" and "odd" channel estimates are alternately accumulated in the accumulators 90 and 92. The even and odd estimates (i.e., the estimates for the alternating even and odd time slots) are summed by the summer 94 to generate a dedicated channel estimate (for coherent demodulation). Also, in a decision block 96 the power of the even and odd estimates are compared and the value of a feedback bit is set depending upon which of the two estimates indicates a greater power. In other words, the receiver 80 determines the power of the received pilot in the odd and even time slots, and determines whether the received power in the odd or the even slot was greater.

Figure 6:
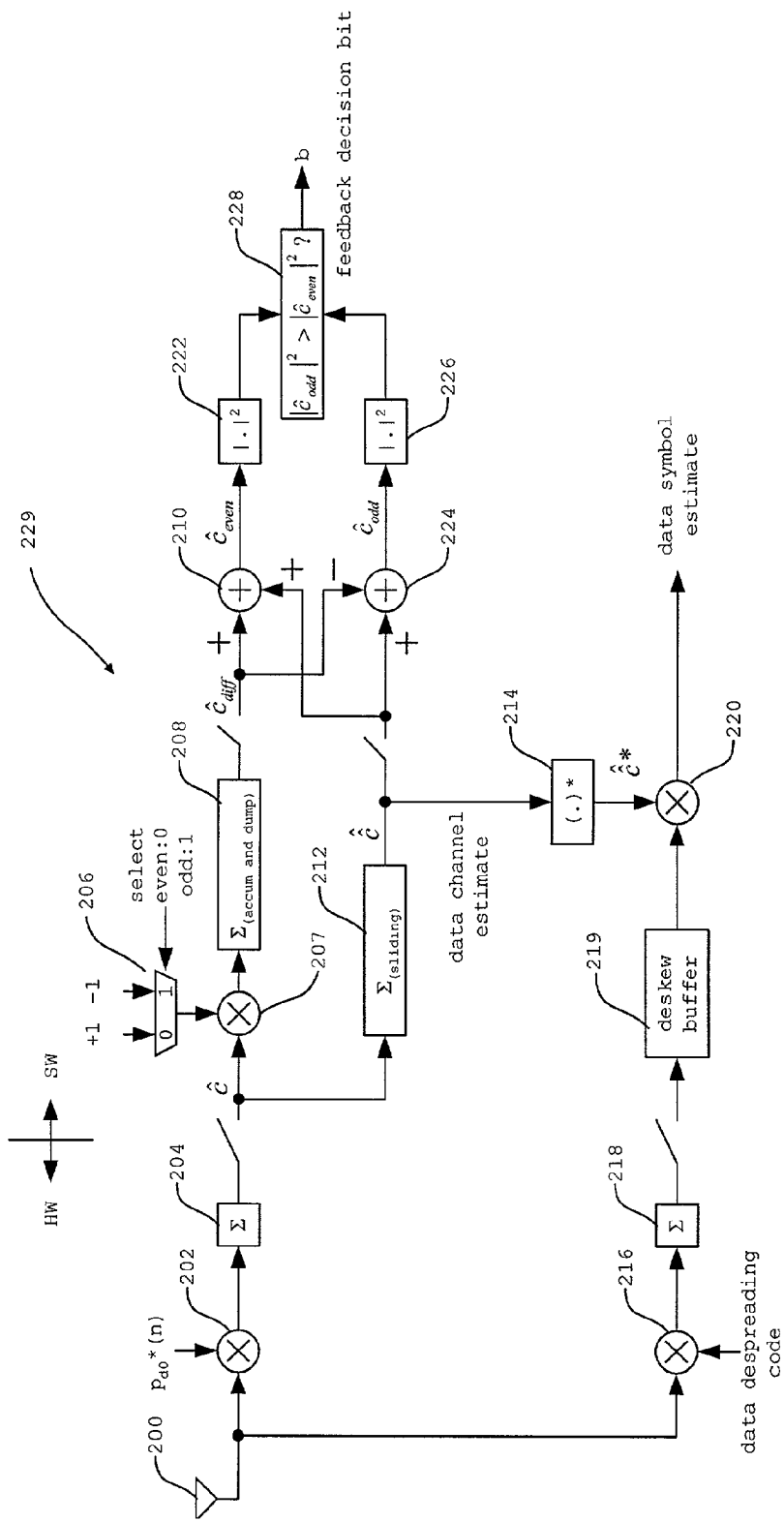
FIG. 6 is a block diagram of a preferred embodiment of a receiver constructed according to the present invention.

FIG. 6 is a block diagram of a preferred embodiment of a receiver (e.g., an MS) 229 constructed according to this invention. FIG. 6 illustrates the efficient use of the pilot format to both aid antennae adaptation and to demodulate incoming data. The pilot is used to extract a preliminary channel estimate $\hat{c}$ using the multiplier 202 and the accumulator 204. A sliding window filter 212 maintains the data channel estimate $\tilde{c}$. The preliminary data symbol estimates are generated by multiplying the data despreading sequence with the received signal using a multiplier 216 and accumulating the result in an accumulator 218. These preliminary symbol estimates are then delayed in a deskew buffer 219. The data channel estimate ĉ is conjugated in a conjugation unit 214 and multiplied with the preliminary data symbol estimates by a multiplier 220 to generate the final data symbol estimates. A channel difference estimate is simultaneously maintained through a separate data path. The preliminary channel estimate ĉ is inverted for odd time slots and non-inverted for even time slots through the selection of the multiplexer 206 and application of ±1 in a multiplier 207, with this result accumulated in an accumulator 208 to generate $\hat{c}_{diff}$. When the measurement interval is complete, even and odd channel estimates are extracted from $\hat{c}_{diff}$ and ĉ using adders 210 and 224. The more powerful channel estimate is then selected using a decision block 228.

In the case of resolvable multipath, the MS tracks several versions of the received pilot, making channel estimates for each one. In order to properly determine which Tx weight vector yields the best receive power, the MS combines the channel estimate powers from each path before performing a decision comparison. Similarly, if the MS 229 has multiple antennae, the decision is based on the sum of channel estimate powers over all antennae.

The same method can be applied to soft handoff, where multiple base stations may be transmitting the same data to the MS with individually adjusted TxAA weight vectors. That is, the processing of the MS can be applied to each BS individually, and the odd/even power summations used to determine the feedback bit is the summation of the powers for each path and for each BS. All BS's receive the same feedback bit and adjust accordingly. This is almost effectively considering the weight vector to be a concatenation of the individual BS weight vectors. Each BS individually normalizes its weight vector. The described method provides a very simple manner for the TxAA to be distributed across several BS's with no increase in MS complexity.

The following describes in greater detail the operation of the transmitter 50 and receiver 229 described above with reference to FIGS. 4 and 6, respectively. The following definitions are used in the description below with regard to the transmit adaptive antenna weighting technique:

| | |
|---|---|
| n | Time index, at the nyquist rate (chip rate for DS-CDMA). |
| m | Time index at decimated (slot) rate, m = ⌊n/N⌋. |
| K | Number of users to which the BS is transmitting. |
| N | Duration of the pilot even/odd banking slot. |
| M | Number of slots between weight updates. |
| u(n) | Transmitted vector at time n, [u]$_i$ is the i$^{th}$ antenna. |
| w(n) | Antenna complex weights for the specific MS described, data channel. |
| w$_{even}$(n) | Antenna complex weights for the specific MS described, even pilot channel. |
| w$_{odd}$(n) | Antenna complex weights for the specific MS described, odd pilot channel. |
| x(n) | Information bearing modulated signal for the specific MS described. |
| p(n) | Dedicated pilot for the specific MS described. |
| g$_{pilot/traffic}$ | Gain for the pilot/traffic channel for the specific MS described. |

The complex baseband representation of the transmitted waveform at the antenna, characterizing the amplitude and phase of the modulated radio carrier transmitted by the antenna (such complex baseband representations are well known, see, e.g., John Proakis, *Digital Communications*, 1995, Third Edition, McGraw-Hill Inc., New York, N.Y.), is given as follows. The equation adds a subscript k differentiating the signals for the plural mobiles.

$$u*(n) = \sum_{k=0}^{K-1} (g_{k,traffic} w_k *(n) x_k(n) + g_{k,pilot}((\lfloor n/N \rfloor \mod 2 == 0) w_{k,even} *(n) +$$

$$(\lfloor n/N \rfloor \mod 2 == 1) w_{k,odd} *(n)) p_k(n))$$

For conciseness of presentation, the following text focuses on the present invention's method from the point of view of a specific mobile with an arbitrary index k, and the subscript k is omitted.

In particular, the odd transmit weight is applied to the dedicated pilot on odd time slots and vice versa for the even weights. To ensure proper coherent demodulation, the even/odd weights are preferably constrained by the following relationship:

$$w(n) = \frac{w_{even}(n) + w_{odd}(n)}{2}$$

It is worth noting that when the odd and even test weights are generated by the perturbation technique described below in more detail, then it is valid to consider that $$w_{base}(n) \cong \frac{w_{even}(n) + w_{odd}(n)}{2},$$

and hence one may in that case use $w_{base}(n)$ as the weight vector applied to the data channel.

Figure 7:
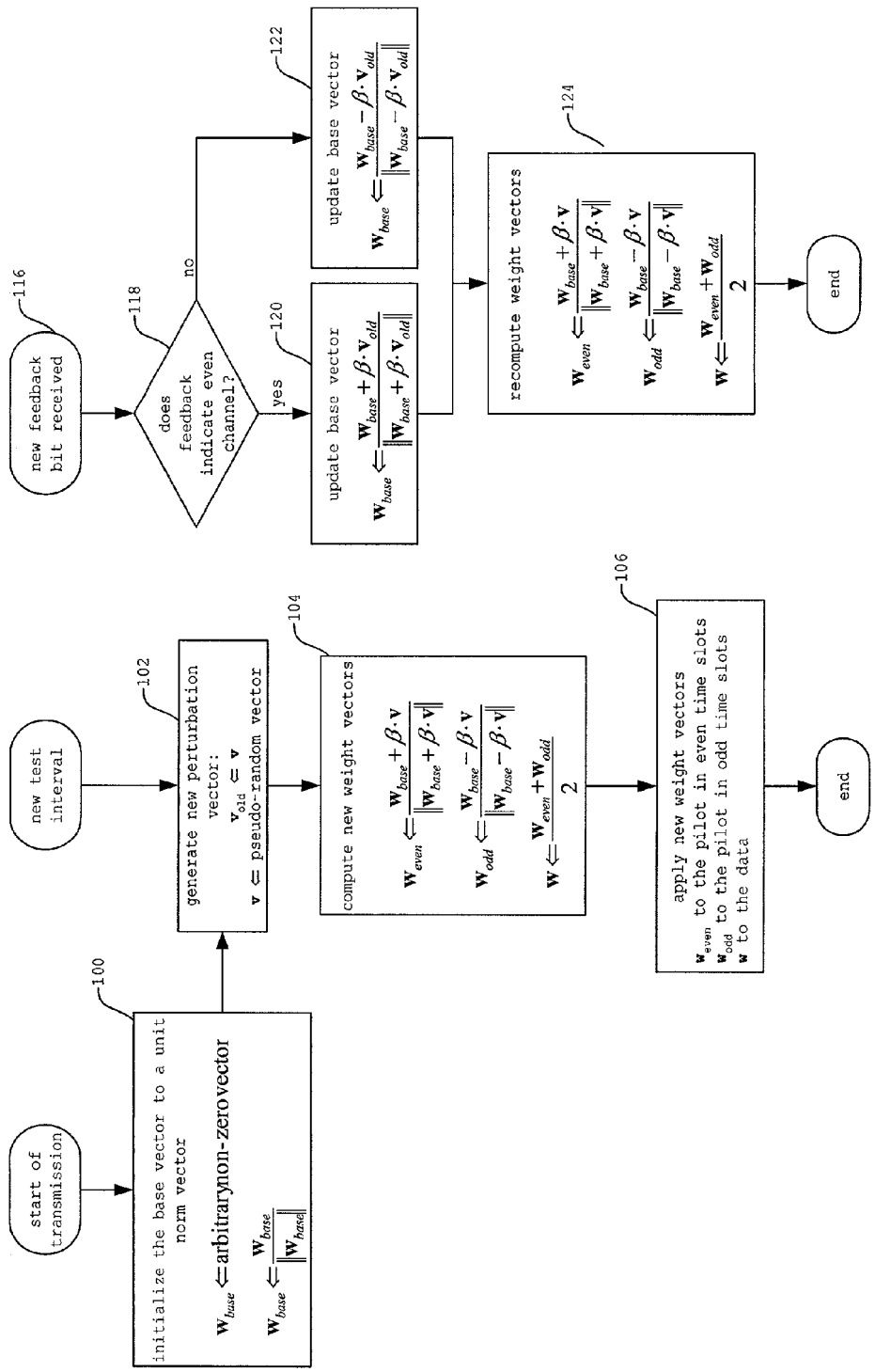
FIG. 7 is a flow chart that outlines pertinent features of the operation of the transmitter shown in FIG. 4.

FIG. 7 is a flow chart that outlines pertinent features of the operation of the transmitter 50. In block 100, a vector $w_{base}$ is initialized to an arbitrary vector with a unit norm. In block 102, a new test perturbation vector v(n) is generated. Each vector entry is a complex number and corresponds to one of the antennae 52 or 54; each such entry therefore corresponds to a test weight to be applied to the transmission of the pilot signal over a particular antenna. The test perturbation vector is preferably determined in a manner such that its entries appear mutually independent. As a point of reference, it is assumed that the expected value (or long term average over many realizations) of the magnitude squared of each complex entry of v is 2, so that E(∥v∥²)=2·(number of antennae). In this way, the amplitude of the applied perturbation is encompassed in the algorithm parameter β, as described below. For example, v(n) could equal [±1±j, . . . ±1±j]$^T$ (v(n) would have just two entries for the example transmitter of FIG. 4), where the +'s and −'s for the entries are randomly determined. However, the preferred v(n) is a complex Gaussian vector of uncorrelated entries with variance of 2.

In block 102 the current value of v is stored as $v_{old}$ and a new value is determined for v. The old value is stored so that when the feedback is received at a later time (block 116) the transmitter 50 knows which perturbation vector the feedback corresponded to and can adapt accordingly. In block 104, even and odd weights and data channel weights are updated based on the new value for v. This is summarized as follows.

When beginning of test interval, $v_{old} \Leftarrow v$;

$v \Leftarrow$ normalized test perturbation vector, new value every NM time indices;

$$w_{even} \Leftarrow \frac{w_{base} + \beta \cdot v}{\|w_{base} + \beta \cdot v\|};$$

$$w_{odd} \Leftarrow \frac{w_{base} - \beta \cdot v}{\|w_{base} - \beta \cdot v\|};$$

$$w \Leftarrow \frac{w_{even} + w_{odd}}{2}.$$

Note: the base weight vector is only updated when feedback is received.

End.

The normalization of the even/odd weight vectors is applied (the 2-norm is used) so that the total power transmitted in even and odd time slots is equal. This normalization prevents the MS 229 from simply selecting the weight vector with the larger transmit power. Rather, the MS 229 must select the weight vector which delivers the maximum power to the mobile for the given transmit power, which is determined by the traffic and pilot channel gains $g_{traffic}$ and $g_{pilot}$.

In block 106, the weights determined in block 104 are applied to the pilot signal. In particular, $w_{even}$ is applied to the pilot signal during even time slots and $w_{odd}$ is applied to the pilot signal during odd time slots, using the multiplexers 68 and 70 as is shown in FIG. 4. In addition, w is applied to the traffic signal during both even and odd slots. The pilot signal and the traffic signal, as modified according to block 104, are transmitted from the antennae 52 and 54. More precisely, a sinusoidal carrier wave is generated for each of the antennae 52 and 54. Each of these carrier waves is modulated by the traffic and pilot signals (modulating signals) as modified according to block 104. Viewed at from another perspective, the weight w adjusts the amplitude and phase of the plurality of radio carrier signals as those carrier signals are modulated by the traffic and pilot signals (modulating signals).

In block 116, which is shown as disjoint from blocks 100–106 for reasons that will be described below, the transmitter 50 receives a feedback bit transmitted by the MS 229.

This feedback bit is based on the decision from the MS 229, which indicates which of the even or odd channels resulted in a greater received signal power and determines the weight updates for the transmitter 50. In block 118, the transmitter determines whether the even weight yields greater power by checking the value of the feedback bit. In one embodiment, a value of "0" indicates that the even channel is better. If so, control passes to block 120, which sets equal to $w_{even}$. In broader terms, $w_{base}$ is a function of $w_{even}$ and $w_{odd}$. In the preferred embodiment, the function is an 'or' type function but more complex functions of weight vectors, including combinations thereof, are contemplated by the present invention. Otherwise, control passes to block 122, which sets $w_{base}$ equal to $w_{odd}$. In block 124, the even and odd weights $w_{even}$ and $w_{odd}$ and the data weight w are updated based on the new $w_{base}$. This is summarized by the following pseudo-code:

when feedback received
  if (feedback=0, indicating even channel is better)

$$w_{base} \Leftarrow \frac{w_{base} + \beta \cdot v_{old}}{\|w_{k,base} + \beta \cdot v_{old}\|};$$

else $$w_{base} \Leftarrow \frac{w_{base} - \beta \cdot v_{old}}{\|w_{k,base} - \beta \cdot v_{old}\|};$$

end $$w_{even} \Leftarrow \frac{w_{base} + \beta \cdot v}{\|w_{base} + \beta \cdot v\|};$$

$$w_{odd} \Leftarrow \frac{w_{base} - \beta \cdot v}{\|w_{base} - \beta \cdot v\|};$$

$$w \Leftarrow \frac{w_{even} + w_{odd}}{2};$$

end

As noted above, block 116 (and related blocks) are shown as disjoint from blocks 100–106. This is because the processes represented by these two sets of blocks are independent of one another, as can be seen from FIG. 10, a timing diagram that shows a possible timeline for weight adjustment and channel measurement. Waveform 130 shows the timing of updates to $w_{base}$, which are performed in blocks 120 and 122. Waveform 132 shows updates to v, which are performed in block 102. Waveforms 134 and 136 show updates to $w_{even}$ and $w_{odd}$, which are performed in blocks 104 and 124. Waveform 138 shows updates to the data channel weight vector w, which are performed in blocks 104 and 124.

As shown by the waveform 132, the test vector v (step 102) is periodically generated and independently of feedback received from the MS 229. The updates to $w_{even}$ and $w_{odd}$ caused by a v are indicated by solid vertical lines in the FIG. 10 while the updates to $w_{even}$ and $w_{odd}$ caused by feedback received from the MS 229 are indicated by the dashed vertical lines in the Figure.

The parameter β is an algorithm constant which is to be selected to improve performance. The value β defines the adaptation rate, where a larger β allows the weight vector to adapt more quickly (i.e. more quickly converge and better track a dynamic channel), but also introduces additional noise on the weight vector applied as a larger adjustment is made. For example, when the weights are settled near their optimal value, each weight is still constantly adjusted by ±βv. Also, β determines the size of the test perturbation applied to the weight vector, and hence will effect both the ability of the MS to correctly determine which test weight vector provides the larger power, and the amount of interference seen by other MS's. A larger β will cause the difference between the two test weight vectors to be larger, and hence it is more likely that this difference will exceed any noise contributions to the measurement by the receiver 80 or receiver 229. A larger β also causes more "splatter", wherein the antenna pilot transmission test weights are perturbed more from the base weights, which are adjusted towards an optimal value, and hence the odd/even pilots cause more interference to other MS's than the data weight. As an enhancement to the present invention, it is possible to individually tune these two effects (i.e., the adaptation rate vs. weight noise tradeoff, and the noise immunity vs. splatter tradeoff) with a $\beta_1$ and a $\beta_2$, as is described later.

Figure 8:
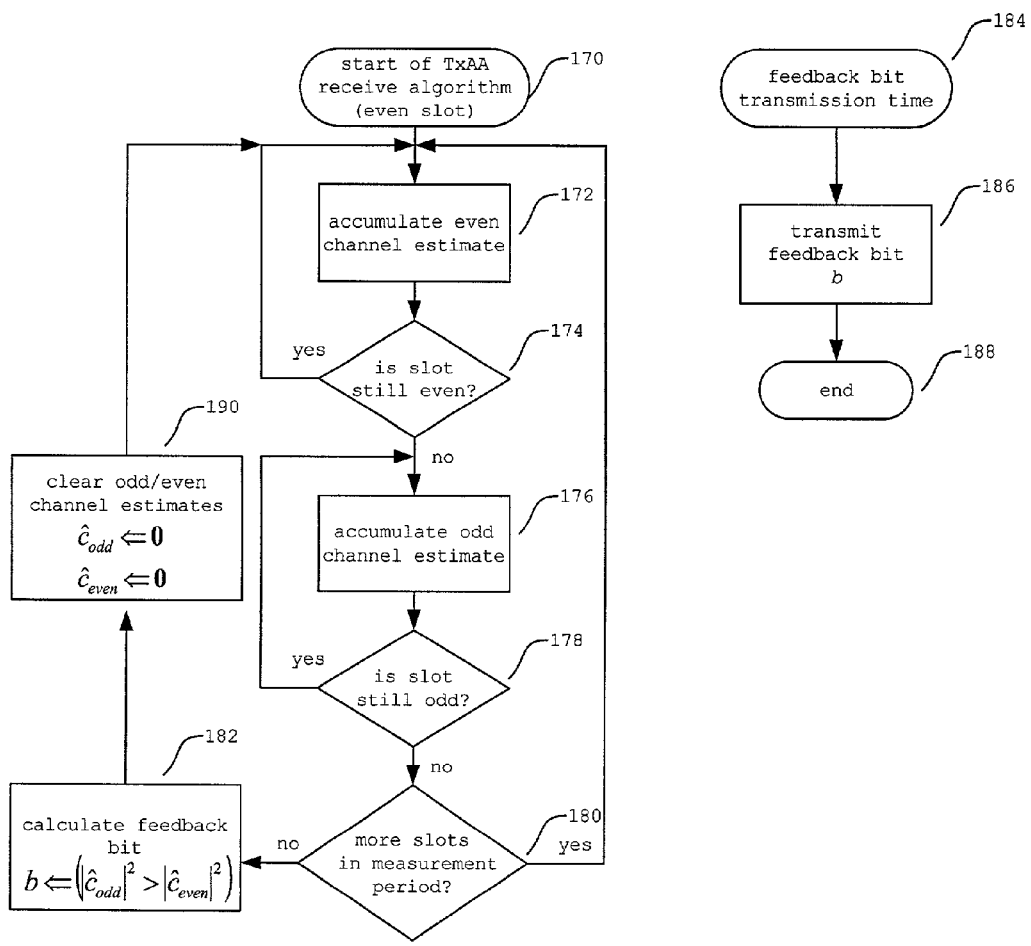
FIG. 8 is a flow chart that outlines pertinent features of the operation of the receiver shown in FIG. 5.

FIG. 8 is a flow chart that outlines pertinent features of the operation of the receiver of FIG. 5. In block 172 the even channel estimate is accumulated, which continues during the entire even time slot according to the decision determined at decision block 174. At the beginning of the odd time slot, the odd channel estimate is accumulated in block 176, which continues during the entire odd time slot according to the decision determined at a decision block 178. The even/odd channel accumulations continue until it is determined by block 180 that the measurement period is complete. When the measurement period is determined to be completed, the feedback decision is calculated and the resultant bit stored for transmission at the appropriate time in block 182. The odd and even channel estimates are then cleared in block 190 and the process is repeated for the new measurement period by returning to the processing block 172. At the appropriate time, which is independent of the timing of the channel estimation procedure just described, the MS starts transmission of the feedback bit, which is shown in processing blocks 184, 186, and 188.

Figure 9:
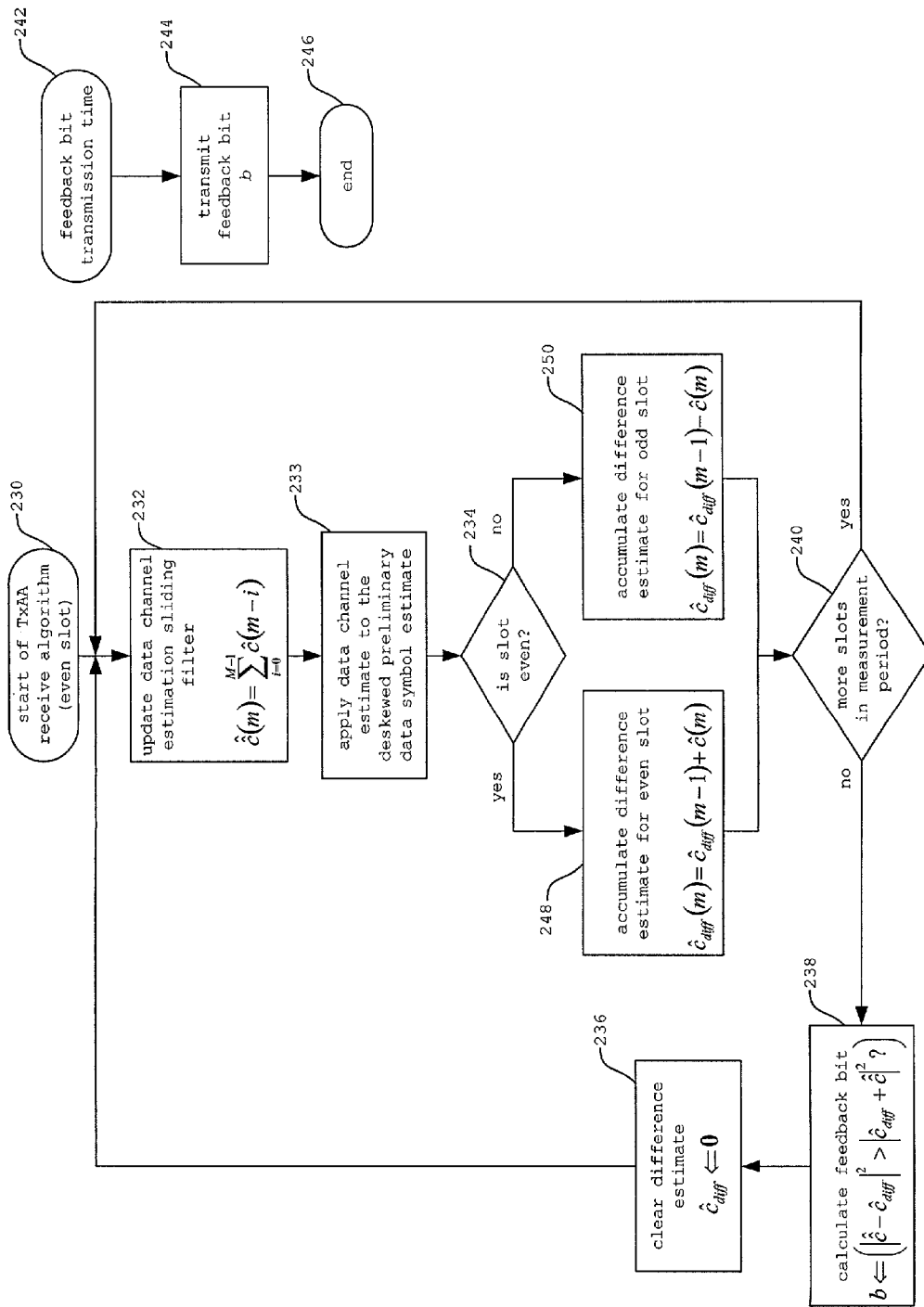
FIG. 9 is a flow chart that outlines pertinent features of the operation of the receiver shown in FIG. 6.

FIG. 9 is a flow chart which outlines the pertinent features of the operation of the receiver of the preferred embodiment of FIG. 6. In block 232 the sliding window data channel estimate is updated. The duration of the sliding window is shown as M slots, covering the duration of a measurement interval, as is preferred. The data channel estimate is applied to the preliminary symbol estimate in block 233. The state of the slot being processed is used in block 234 to determine the sign of the channel difference accumulation by adding the preliminary channel estimate in block 248 if it is an even slot, or subtracting the preliminary channel estimate in block 250 if it is an odd slot. Block 240 determines if the measurement interval is complete, continuing the process by returning to block 232 if the interval is not complete. When the measurement period is determined to be completed by block 240, the feedback decision is calculated and the resultant bit stored for transmission at the appropriate time in block 238. The difference estimate is then cleared in block 236 and the process returns to block 232. At the appropriate time, which is independent of the timing of the channel estimation procedure just described, the MS 229 starts transmission of the feedback bit, which is shown in blocks 242, 244 and 246.

Figure 10:
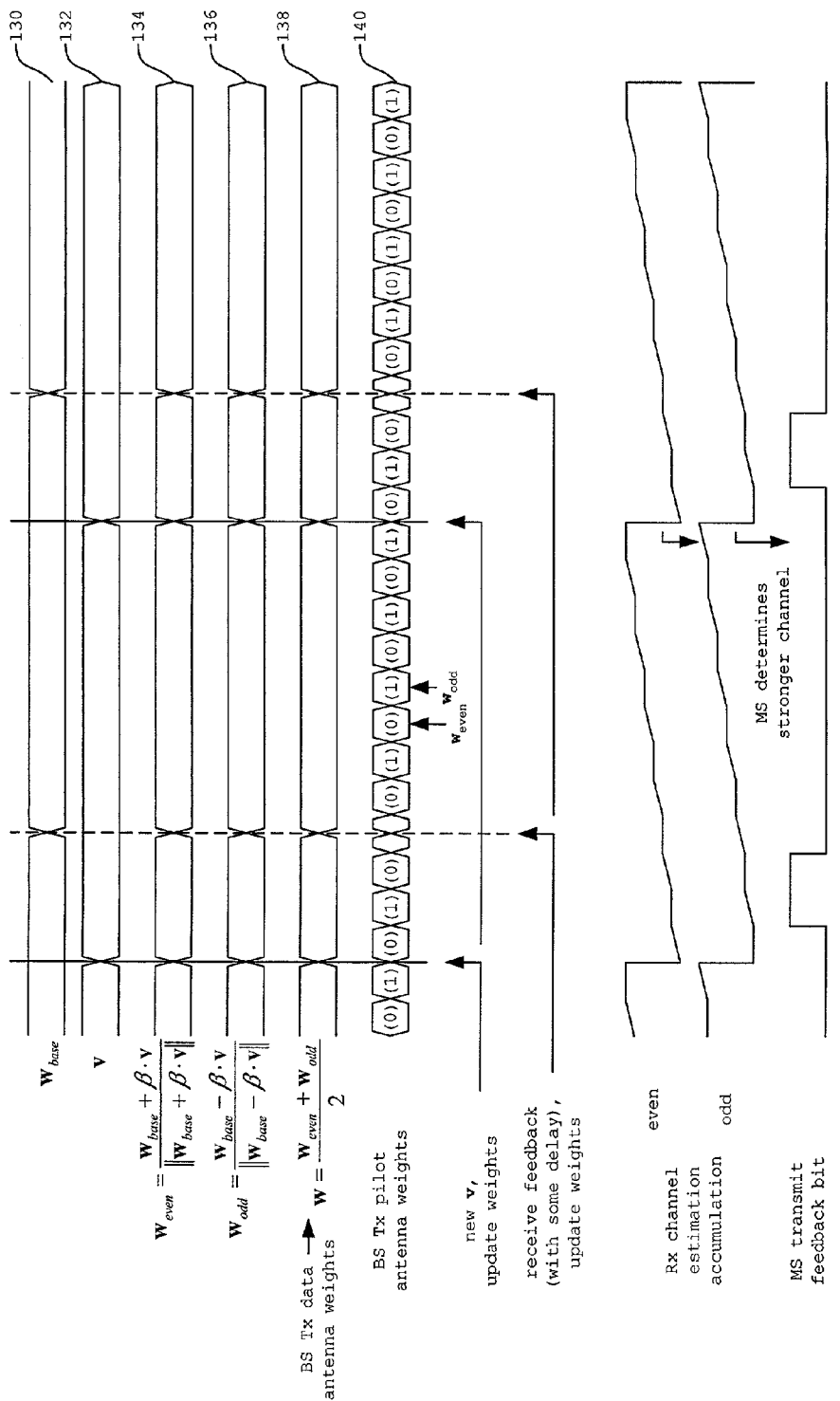
FIG. 10 is a timing diagram that shows a preferred timeline for weight adjustment, channel measurement and feedback.

FIG. 10 shows a time line of this process with certain parameters selected by way of example. The accumulations for this example are over 12 time slots, the feedback bit is transmitted one time slot later, and the transmit weight update occurs as soon as the transmitter 50 receives it. In this case, the transmitter 50 updates the test perturbation vector v prior to receiving the update, so that the measurement of the new perturbation can begin. Because each update is fairly small, this mechanism allows for increasing the efficiency of the measurement time. The measurement of the new perturbation will be insignificantly modified by the overlap.

As previously described with reference to FIG. 7, at the beginning of each test period, the transmitter 50 determines a new perturbation vector v and applies it to the old $w_{base}$. As soon as the feedback arrives, this same new v is applied to the new $w_{base}$. This allows for maximizing the measurement interval without delaying the next test perturbation. Because the updates are relatively small, the new perturbation will still yields a valid measurement result even though it is applied to both the old and the new $w_{base}$.

The invention may be implemented for "soft handoff" systems. Soft handoff in DS-CDMA systems is an operational mode wherein multiple BS's, each using a different spreading code, transmit the same data to a single MS. The reception at the mobile of these multiple signals benefits performance by providing diversity. According to one embodiment of the present invention, soft handoff may be implemented in the following manner. Each BS independently generates test weight vectors $w_{odd}$ and $w_{even}$ through the independent generation of test perturbation vectors v. Each BS transmits the pilot and data as previously described. The MS makes a single decision based on the summation of the channel estimate powers for all BS's, and transmits a single feedback bit as previously described. Each BS independently implements the weight adaptation as previously described, without regard to the fact that it is in soft handoff mode. In summary, the MS uses the summation of all BS powers for the decision, and each BS behaves exactly as though it would even if not in soft handoff mode.

The application of the system described herein to the IS-95 standard and its derivative cdma2000 most likely would use N=64 chips (chip rate 1.2288 MHz, giving 52.083us time multiplexing) and 1.25 ms decision intervals. The length of the total even/odd accumulation is implementation specific in the mobile, but probably 8N, 12N, 16N or 24N (½ of that for each of the even/odd accumulations). Another possible alternative would be 0.625 ms decision intervals, in which case the total even/odd accumulation would probably not exceed 12N. These timings fit well into the existing specification as 64 chips is the original symbol duration from IS-95 and still a common time unit, and 1.25 ms is a "power control group", the timing upon which over-the-air closed loop power control updates take place, and is 1/16 of the most common frame length, 20 ms. It will be appreciated that the present invention is not limited to any of the specific quantities described above.

Some Alternate Embodiments

It will be appreciated that it is possible to use more than 2 time slots and a corresponding number of test weight vectors, which may be generated from a corresponding number of test perturbation vectors. Also, more than 1 bit can be used as feedback, corresponding to a greater number of time slots.

The generation of the test perturbation v can be implemented in many ways. Such generation should be pseudo-random so that over the long term the summation $\Sigma vv^H$ approaches an equi-diagonal matrix. The random elements can be generated as some probability distribution other than the binary one described (e.g., uniform distribution, Gaussian distribution). Rather than pseudo-random generation, the vector can be generated by cycling through some fixed sequence. For example, the sequence $[1\ 0\ 0\ \ldots\ 0]^T$ $[j\ 0\ 0\ \ldots\ 0]^T$ $[0\ 1\ 0\ \ldots\ 0]^T$ $[0\ j\ 0\ \ldots\ 0]^T$ can be selected in one embodiment, to scan through each weight independently. This satisfies the requirement on the long term summation of $vv^H$.

The value of $\beta$ can itself be adaptive. For fast varying channels, the value could be made larger, and for slower channels it could be made smaller. This would allow for some optimization of β with respect to channel variation rate.

The weight update can be further parameterized, allowing independent optimization of the adaptation rate vs. weight noise ($\beta_1$) and the measurability in noise vs. splatter ($\beta_2$) tradeoffs. $\beta_1$ is then applied to the update of $w_{base}$, while $\beta_2$ is applied to the test weight vectors $w_{odd}$ and $w_{even}$. This can be performed in accordance with the following pseudo-code:

when feedback received or new test interval
  if (new test interval)
    $v_{old} \Leftarrow v$
    $v \Leftarrow$ normalized test perturbation function
  end
  if (feedback received)
    if (feedback==0, indicating the even channel was better)

$$w_{base} \Leftarrow \frac{w_{base} + \beta_2 v_{old}}{\|w_{base} + \beta_2 v_{old}\|};$$

else $$w_{base} \Leftarrow \frac{w_{base} - \beta_2 v_{old}}{\|w_{base} - \beta_2 v_{old}\|};$$

end
  end $$w_{even} \Leftarrow \frac{w_{base} + \beta_1 v}{\|w_{base} + \beta_1 v\|};$$

$$w_{odd} \Leftarrow \frac{w_{base} - \beta_1 v}{\|w_{base} - \beta_1 v\|};$$

$$w \Leftarrow \frac{w_{even} + w_{odd}}{2};$$

end

The parameters used in the time line of FIG. 10 are exemplary only and can be easily modified.

The exact nature of the feedback channel is not specified. It can be implemented as a puncturing onto the data channel as the power control bit is implemented in IS95, or onto the pilot channel as in cdma2000, or in some other manner.

The MS can generate the channel estimations in a different manner than described.

The weight normalization described above is a total power normalization. Other normalizations can be chosen.

Alternate treatments of soft handoff can be used, though the previously described method is preferred. Rather than using only 1 feedback bit, a feedback bit may be included for each such base station (or each such BS that has adaptive Tx antennae enabled) so that the mobile can send commands to each, or alternatively can time-multiplex the feedback bits between the various BS's. The latter would result in a significant loss of performance to accommodate the slower adaptation times.

The test weights $w_{odd}$ and $w_{even}$ are described as being applied in separate time slots. It is possible to use other orthogonal modulation techniques such that they may be extracted. For example, rather than an odd and even time slot, odd and even orthogonal codes (perhaps from a set of Walsh codes) could be used. This is not desirable for the preferred embodiment but may be desirable in other embodiments.

While the transmission medium is assumed to be the propagation of radio waves from transmitting antennae to a receiving antenna (or antennae), the invention is obviously extendable to the propagation of waves in other media. For example, the medium could be acoustic waves in a fluid or gas, from transmitting transducers to a receiving transducer (or transducers).

Transmit Adaptive Antenna (TxAA) Weighting with Overlaid Perturbation Vectors Technique The transmit adaptive antenna weighting with overlaid perturbation vectors technique relies upon the observation that signal interference and degradation in a communication system can be decreased by reducing the transmit power of dedicated pilot signals. The present transmit adaptive antenna (TxAA) weighting with overlaid perturbation vectors technique reduces transmit power that is associated with dedicated pilot signals by overlaying perturbation vectors and measuring channel estimates and demodulation channel estimates during a measurement time interval that comprises a plurality of feedback time intervals. Thus, channel estimates include the effects of previous perturbation vectors, subsequent feedback vectors and intermediate feedback decisions.

In accordance with the present invention, receivers measure continuous summations of overlaid weight vector perturbation (OWVP) vectors. One embodiment of the technique described hereinbelow utilizes the Transmit Adaptive Antenna (TxAA) weight adaptation technique described above as the feedback algorithm and a sliding window filter that is capable of measuring a continuous summation of OWVP vectors. Another embodiment of the technique utilizes multi-bit feedback with multiple simultaneous perturbation vectors. The inventive method extracts a coarse gradient estimate by utilizing a continuous summation of OWVP vectors and updates the weighting vector accordingly. A basic binary gradient feedback algorithm of the above-described TxAA Weighting Embodiment that is adapted for use with the present invention is now described in some detail.

The following definitions are used in the description below.

| | |
|---|---|
| receive unit | The unit which is receiving the signals which are sent according to the transmit weight adaptation algorithm, generally referred to as the mobile station. This unit is also actively transmitting, as at a minimum the feedback information must be transmitted to the "transmit" unit, and probably there is other reverse traffic and signaling. |
| transmit unit | The unit which is transmitting the signals which are sent according to the transmit weight adaptation algorithm, generally referred to as the base station. This unit is also actively receiving, as at a minimum the feedback information must be received from the "receive" unit, and probably there is other reverse traffic and signaling. |
| $\|\cdot\|$ | Matrix or vector norm 2-norm. For a vector x, the two norm is $\|x\|_2 \equiv \sqrt{x^H x}$. For a matrix A, the two norm is $$\|A\|_2 \equiv \sqrt{\max_{x, \|x\|_2 = 1} (x^H A^H A x)}.$$ |
| n | Time index, at the nyquist rate. |
| L | Number of transmit antennas. |
| N | Duration of the pilot even/odd banking slot. |
| M | Number of slots between weight updates. |

-continued

| | |
|---|---|
| u(n) | L-by-1 vector, transmitted vector at time n, [u]$_i$ is the i$^{th}$ antenna. |
| e(n) | L-by-1 vector, forward channel gain vector, complex gain from each antenna of the Tx unit to the antenna of Rx unit. |
| w(n) | L-by-1 vector, antenna complex weights for MS data channel. |
| w$_{even}$(n) | L-by-1 vector, antenna complex weights for MS, even pilot channel. |
| w$_{odd}$(n) | L-by-1 vector, antenna complex weights for MS, odd pilot channel. |
| v(n) | L-by-1 vector, test perturbation to the complex weights. |
| x(n) | Information bearing modulated signal for user. |
| p(n) | Dedicated pilot for user. |
| g$_{pilot/traffic}$ | Gain for the pilot/traffic channel for user. |

The basic binary gradient feedback algorithm of the TxAA Weighting Embodiment that is adapted for use with the present invention incorporates a simple implementation of the TxAA Weighting Embodiment. In accordance with the basic binary gradient feedback algorithm, transmitted waveforms are described for only one user (e.g., a receiver), while multiple waveforms are summed for multiple receivers. The complex baseband representation of a transmitted waveform given by the complex conjugate of u(n) is given as follows:

$$u(n) = g_{k,traffic} w*(n)x(n) + g_{pilot}((\lfloor n/N \rfloor \mod 2 == 0)w_{even}*(n) + (\lfloor n/N \rfloor \mod 2 == 1)w_{odd}*(n))p(n)$$

Thus, given the channel gain vector c, the waveform received at the antenna of the receive unit is as follows:

$$r_{rx}(n) = u^T(n)c(n) = w^H(n)c(n)g_{traffic}x(n) + g_{pilot}((\lfloor n/N \rfloor \mod 2 == 0)w_{even}^H(n)c(n) + (\lfloor n/N \rfloor \mod 2 == 1)w_{odd}^H(n)c(n))p(n)$$

Maximizing the received power for a constrained weight vector norm results in the following ratio:

$$w = \frac{c}{\|c\|}$$

This ratio is the weight vector to which the algorithm converges.

In accordance with the binary gradient feedback algorithm, odd transmit weights are applied to dedicated pilots during odd time slots and even transmit weights are applied to dedicated pilots during even time slots. In a receiver coherent demodulation embodiment, the algorithm constrains even/odd weights according to the following relation:

$$w(n) = \frac{w_{even}(n) + w_{odd}(n)}{2}$$

Receivers advantageously utilize pilot/data antenna weight selection. The algorithm generates channel estimates for even and odd weights. The summation of even and odd weights generates data channel estimates that are utilized for coherent demodulation. The difference of the squares of even and odd weights can be utilized to generate a feedback bit. In one exemplary embodiment, a logical zero value is arbitrarily defined as a condition when the even channel yields greater power and conversely a logical one value is defined as a condition when the odd channel yields greater power. In a resolvable multipath embodiment, receivers track several versions of a received pilot and determine channel estimates for each version. Prior to a decision comparison, receivers combine channel estimate powers from each path to determine which Tx weight vector yields the best receive power. Receivers transmit feedback bits to their associated base stations. Base stations utilize this feedback to generate new transmit weights according to the following pseudo-code:

when feedback received $$v\left(\left\lfloor \frac{n}{NM} \right\rfloor\right) = \text{normalized test perturbation function,}$$

new value every NM time indices if (feedback==0)

$$w_{base} \Leftarrow \frac{w_{base} + \beta \cdot \|w_{base}\| \cdot v\left(\left\lfloor \frac{n}{NM} \right\rfloor - 1\right)}{\left\| w_{base} + \beta \cdot \|w_{base}\| \cdot v\left(\left\lfloor \frac{n}{NM} \right\rfloor - 1\right) \right\|}$$

else $$w_{base} \Leftarrow \frac{w_{base} - \beta \cdot \|w_{base}\| \cdot v\left(\left\lfloor \frac{n}{NM} \right\rfloor - 1\right)}{\left\| w_{base} - \beta \cdot \|w_{base}\| \cdot v\left(\left\lfloor \frac{n}{NM} \right\rfloor - 1\right) \right\|}$$

end $$w_{base} \Leftarrow \frac{w_{base} + \beta \cdot \|w_{base}\| \cdot v\left(\left\lfloor \frac{n}{NM} \right\rfloor\right)}{\left\| w_{base} + \beta \cdot \|w_{base}\| \cdot v\left(\left\lfloor \frac{n}{NM} \right\rfloor\right) \right\|}$$

$$w_{base} \Leftarrow \frac{w_{base} - \beta \cdot \|w_{base}\| \cdot v\left(\left\lfloor \frac{n}{NM} \right\rfloor\right)}{\left\| w_{base} - \beta \cdot \|w_{base}\| \cdot v\left(\left\lfloor \frac{n}{NM} \right\rfloor\right) \right\|}$$

$$w \Leftarrow \frac{w_{even} + w_{odd}}{2}$$

end

Test perturbation vectors v can be generated by a plurality of methods, however they are normalized so that β captures the tracking rate. Utilizing a larger β yields faster tracking with larger tracking noise. The transmit adaptive antenna weighting with overlaid perturbation vectors technique is now described in some detail.

Overlaid Perturbation Vectors Technique

The transmit adaptive antenna weighting with overlaid perturbation vectors technique extracts a coarse gradient estimate by utilizing a continuous summation of OWVP vectors and updates weighting vectors accordingly. The inventive technique overlays perturbation vectors, and thus the effects of previous perturbation vectors, subsequent feedback vectors and intermediate feedback decisions are utilized to determine the coarse gradient estimate. The invention advantageously assigns a longer time interval for the channel estimation for perturbation vector selection than the feedback period, and thus estimation accuracy is increased by minimizing the noise variance of the estimation. The present inventive technique increases the rate of feedback and weight adaptation while reducing the power allocated to dedicated pilots on the forward channel. A summary of the present inventive technique is now described.

The TxAA weighting with overlaid perturbation vectors technique is summarized in the following steps:

(a) overlaying a weight vector perturbation (WVP) vector;

(b) measuring the WVP vector;

(c) generating a feedback; and (d) determining a new WVP vector based on the feedback.

In one embodiment, the STEPS (a) and (d) are performed at a transmitting device, while the STEPS (b) and (c) are performed at a receiving device. In STEP (a), the present invention overlays a weight vector perturbation vector during a measurement interval that is greater than a feedback interval. In STEP (b), the present inventive technique measures multiple overlaid perturbation vectors during a feedback interval. One embodiment of the present invention at STEP (b) utilizes a sliding summation filter. One embodiment of the present invention at STEP (c) utilizes a single bit for signifying whether an even channel or an odd channel performs better.

One embodiment of the present invention at STEP (d) determines a new WVP vector by changing the base vector to be the mean vector as applied to either an even or odd time slot during a measurement interval. Therefore, this new WVP vector will include the effects of previous perturbation vectors, subsequent feedback vectors and intermediate feedback decisions because these effects comprise a complete applied weight vector, which was measured to provide the feedback decision. An exemplary embodiment of the transmit adaptive antenna weighting with overlaid perturbation vectors technique is now described in greater detail.

The perturbed weight vectors $w_{even}$ and $w_{odd}$, each incorporating overlaid perturbations, will be applied to the pilot for transmission in even and odd time slots, respectively, while w is set to the average of $w_{even}$ and $w_{odd}$ and applied to the traffic for transmission. In an alternate embodiment, a difference weight vector $w_{delta}$ is set to $w_{even} - w_{odd}$, and w is applied to the traffic while both w and $w_{delta}$ are applied to the pilot with some form of multiplexing technique such that they may be individually recovered at the receiver. One skilled in the art shall recognize that any multiplexing technique comprising orthogonal covering such as Code Division Multiplexing, Frequency Division Multiplexing and Time Division Multiplexing can be utilized with the present invention without departing from the scope and spirit of the present invention. For example, if the w is modulated by sequential multiplication by [+1 +1] (i.e., applied positively in even and odd time slots) and $w_{delta}$ is modulated by sequential multiplication by [+1 -1] (i.e., applied positively in even and negatively in odd time slots). These modulated weight vectors are added and applied to the pilot sequence, then the even/odd multiplexing of $w_{even}$ and $w_{odd}$, which has been described in detail, is attained.

The exemplary transmit adaptive antenna weighting with overlaid perturbation vectors technique assigns a time index i to each feedback interval, wherein a measurement interval comprises I feedback intervals. Hence, there are I overlaid perturbations at any instant of time, and the measurement at every instant of time is applied to I different feedback decisions.

The present inventive technique utilizes a series of perturbation vectors, v[i] that begin at a time index i and have a duration of I. At the time index i feedback corresponding to the I−1 most recent perturbation vectors has not yet been received. Hence, the cumulative perturbation applied to the weight vector is the summation of I perturbation vectors, the sum of the I−1 most recent "latent" perturbation vectors and the new perturbation vector at time i. With β as the adaptation constant, even and odd weight vectors are applied as shown in the following equations:

$$w_{even}(i) = \frac{w_{base}(i) + \beta \|w_{base}(i)\| \cdot \sum_{k=i-I+1}^{i} v(k)}{\left\| w_{base}(i) + \beta \|w_{base}(i)\| \cdot \sum_{k=i-I+1}^{i} v(k) \right\|}$$

$$w_{odd}(i) = \frac{w_{base}(i) - \beta \|w_{base}(i)\| \cdot \sum_{k=i-I+1}^{i} v(k)}{\left\| w_{base}(i) - \beta \|w_{base}(i)\| \cdot \sum_{k=i-I+1}^{i} v(k) \right\|}$$

$$w(i) = \frac{w_{even}(i) + w_{odd}(i)}{2}$$

A synchronous feedback embodiment (i.e., no feedback delay) of the update algorithm of the TxAA weighting with overlaid perturbation vectors technique can be represented by the following pseudo-code:

at time i (new measurement interval, feedback received)
    if (feedback==0, indicating the even channel was better)

$$w_{base}(i) = \frac{\sum_{k=i-I}^{i-1} w_{even}(k)}{\left\| \sum_{k=i-I}^{i-1} w_{even}(k) \right\|}$$

else $$w_{base}(i) = \frac{\sum_{k=i-I}^{i-1} w_{odd}(k)}{\left\| \sum_{k=i-I}^{i-1} w_{odd}(k) \right\|}$$

end
v(i)=normalized test perturbation function $$w_{even}(i) = \frac{w_{base}(i) + \beta \|w_{base}(i)\| \sum_{k=i-I+1}^{i} v(k)}{\left\| w_{base}(i) + \beta \|w_{base}(i)\| \sum_{k=i-I+1}^{i} v(k) \right\|}$$

$$w_{odd}(i) = \frac{w_{base}(i) - \beta \|w_{base}(i)\| \sum_{k=i-I+1}^{i} v(k)}{\left\| w_{base}(i) - \beta \|w_{base}(i)\| \sum_{k=i-I+1}^{i} v(k) \right\|}$$

-continued
$$w(i) = \frac{w_{even}(i) + w_{odd}(i)}{2}$$

end

In a non-synchronous feedback embodiment (i.e., a non-zero feedback delay) of the update algorithm of the TxAA weighting with overlaid perturbation vectors technique, the feedback suffers from a time lag due to the non-zero feedback delay. Thus, the present inventive technique incorporates the effects of the time lag when updating the base weights, $w_{base}$. The present technique can also define parameters such as $\beta_1$ and $\beta_2$ to independently adjust the perturbation sizes and the feedback steps that are applied. In the exemplary above-described embodiment of the transmit adaptive antenna weighting with overlaid perturbation vectors technique the parameters $\beta_1$ and $\beta_2$ have equal values, and thus the parameters reduce to a single parameter, $\beta$. An exemplary multi-parameter embodiment of the present transmit adaptive antenna weighting with overlaid perturbation vectors technique is now described.

The multi-parameter embodiment represents lagged feedbacks through the utilization of multiple indices. The multi-parameter embodiment is described below in the context of two parameters, $\beta_1$ and $\beta_2$. One skilled in the communication arts shall recognize that different numbers of parameters such as three parameters can be utilized with the present invention without departing from the scope of the present invention. For example, different weightings such as weighting v[i-k] by $\beta_{1,k}$ and $\beta_{2,k}$ for the difference time indexed perturbations can be utilized without departing from the scope of the present invention. The multi-parameter embodiment represents lagged feedback by a second time index that is applied to all variables that require it. In accordance with the multi-parameter embodiment, the second time index has a logical value of either a logical 0 or a logical 1 that represents "before feedback received" and "after feedback received", respectively. For example, $w_{base}(i, 0)$ represents the value of the vector $w_{base}$ during slot i and prior to the reception of the feedback from slot i−1, and $w_{base}(i, 1)$ represents the value of the vector $w_{base}$ during slot i and after the reception of the feedback from slot i−1.

The multi-parameter embodiment also utilizes a parameter $\alpha$ that represents the value of the fraction of the feedback period that occurs prior to the reception and processing of the feedback bit at the base station. This embodiment utilizes the parameter $\alpha$ to update base weights with the appropriate weighting of all of the weight vector values that were applied during even or odd time slots of the measurement interval.

The multi-parameter embodiment of the update algorithm of the TxAA weighting with overlaid perturbation vectors technique can be represented by the following pseudo-code:

at time (i,0) (start new measurement interval, prior to receiving feedback in this interval)
  $w_{base}(i,0) = w_{base}(i-1,1)$ (unchanged)
  v(i)=normalized test perturbation function $$w_{even}(i, 0) = \frac{w_{base}(i, 0) + \beta_1 \|w_{base}(i, 0)\| \sum_{k=i-I+1}^{i} v(k)}{\left\| w_{base}(i, 0) + \beta_1 \|w_{base}(i, 0)\| \sum_{k=i-I+1}^{i} v(k) \right\|}$$

-continued
$$w_{odd}(i, 0) = \frac{w_{base}(i, 0) - \beta_1 \|w_{base}(i, 0)\| \sum_{k=i-I+1}^{i} v(k)}{\left\| w_{base}(i, 0) - \beta_1 \|w_{base}(i, 0)\| \sum_{k=i-I+1}^{i} v(k) \right\|}$$

$$w(i, 0) = \frac{w_{even}(i, 0) + w_{odd}(i, 0)}{2}$$

end
at time (i,1) (feedback is received)
if (feedback==0, indicating the even channel was better)

$$w_{base}(i, 1) = \frac{w_{base}(i, 0) + \frac{\beta_2}{\beta_1}\left(\frac{1}{I}\sum_{k=i-I}^{i-1}(\alpha w_{even}(k, 0) + (1-\alpha)w_{even}(k-1, 1)) - w_{base}(i, 0)\right)}{\left\|w_{base}(i, 0) + \frac{\beta_2}{\beta_1}\left(\frac{1}{I}\sum_{k=i-I}^{i-1}(\alpha w_{even}(k, 0) + (1-\alpha)w_{even}(k-1, 1)) - w_{base}(i, 0)\right)\right\|}$$

else $$w_{base}(i, 1) = \frac{w_{base}(i, 0) - \frac{\beta_2}{\beta_1}\left(\frac{1}{I}\sum_{k=i-I}^{i-1}(\alpha w_{odd}(k, 0) + (1-\alpha)w_{odd}(k-1, 1)) - w_{base}(i, 0)\right)}{\left\|w_{base}(i, 0) - \frac{\beta_2}{\beta_1}\left(\frac{1}{I}\sum_{k=i-I}^{i-1}(\alpha w_{odd}(k, 0) + (1-\alpha)w_{odd}(k-1, 1)) - w_{base}(i, 0)\right)\right\|}$$

end $$w_{even}(i, 1) = \frac{w_{base}(i, 1) + \beta_1 \|w_{base}(i, 1)\| \sum_{k=i-I+1}^{i} v(k)}{\left\| w_{base}(i, 1) + \beta_1 \|w_{base}(i, 1)\| \sum_{k=i-I+1}^{i} v(k) \right\|}$$

$$w_{odd}(i, 1) = \frac{w_{base}(i, 1) - \beta_1 \|w_{base}(i, 1)\| \sum_{k=i-I+1}^{i} v(k)}{\left\| w_{base}(i, 1) - \beta_1 \|w_{base}(i, 1)\| \sum_{k=i-I+1}^{i} v(k) \right\|}$$

$$w(i, 1) = \frac{w_{even}(i, 1) + w_{odd}(i, 1)}{2}$$

end

An exemplary receiving device that is adapted for use with the present inventive TxAA weighting with overlaid perturbation vectors technique is now described in detail with reference to FIG. 11. The receiving unit generates feedback that indicates whether the even or odd channel yielded a larger power value by summing the even channel estimate during the measurement interval (i.e., I instances of the feedback period), and similarly summing the odd channel estimate. In contrast to the above-described TxAA weighting embodiment (FIGS. 4–10), the present inventive TxAA weighting with overlaid perturbation vectors technique calculates a summation that overlaps with summations of previous and subsequent feedback decisions. The exemplary embodiment described below with reference to FIG. 11 determines summations by a sliding window filter. Advantageously, sliding window filters are already utilized in coherent demodulation systems to determine the channel estimation. The exemplary receiving device is now described.

Figure 11:
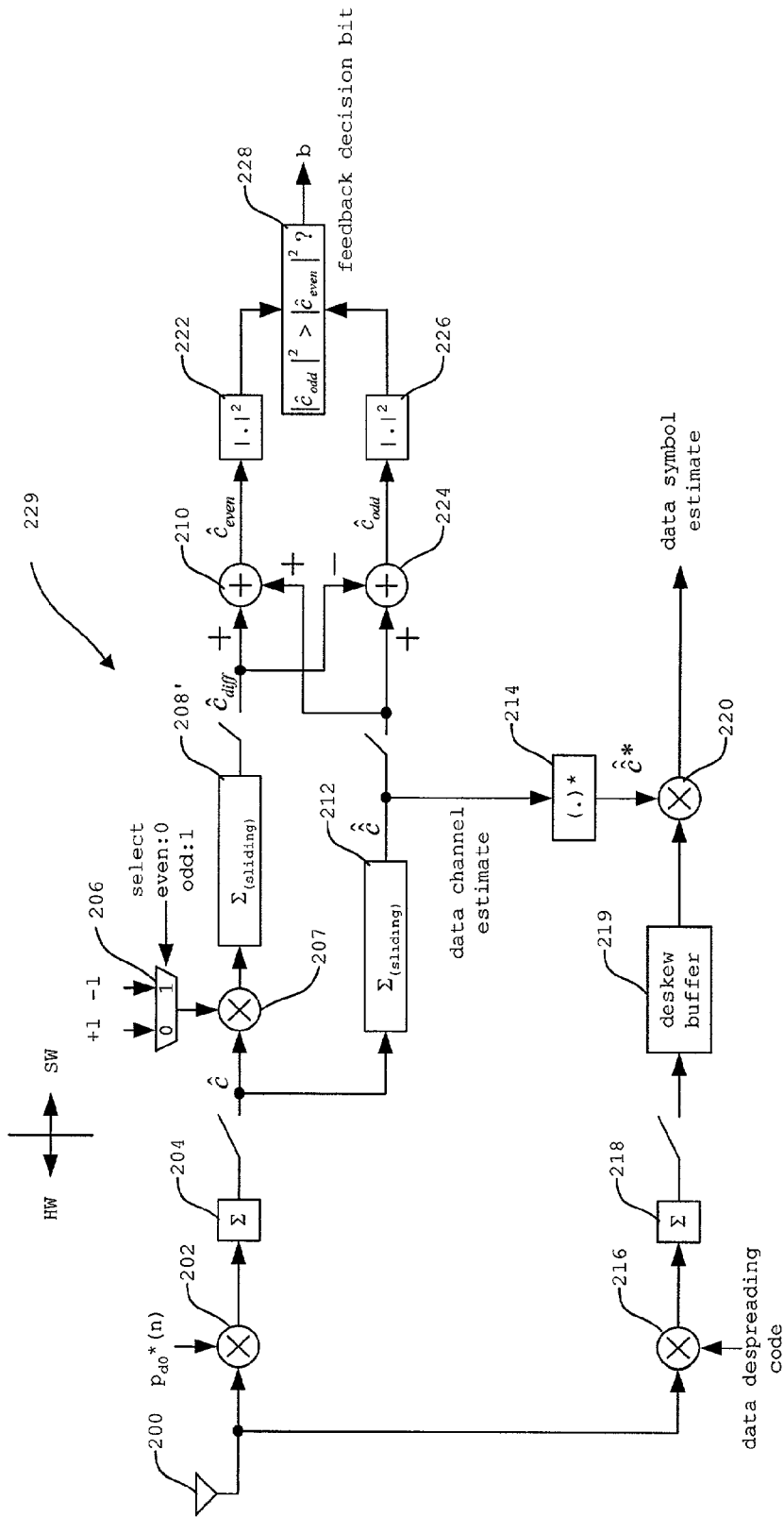
FIG. 11 is a block diagram of an exemplary receiving device that is adapted for use with the present invention.

FIG. 11 is a block diagram of an exemplary receiving device that is adapted for use with the present inventive TxAA weighting with overlaid perturbation vectors technique. The exemplary receiving device 229 of FIG. 11 is substantially similar to the receiving device described above with reference to FIG. 6, and thus similar components are not described again. As shown in FIG. 11, a sliding window filter 208' is operatively connected to the multiplier 207 and adders 210, 224. The exemplary receiving device 229 comprises two sliding window filters 208', 212 that are utilized to extract or determine a coherent demodulation channel estimate and a feedback channel estimate. One skilled in the communication arts shall recognize that various methods of implementing a two sliding window filter receiving device that can determine a coherent demodulation channel estimate and a feedback channel estimate can be utilized with the present invention without departing from the scope of the present invention. Two such methods are now described in some detail.

In one embodiment, the exemplary receiving device 229 comprises two sliding window filters 208', 212, wherein the sliding window filter 212 is a "common mode" filter (i.e., sum of even and odd channels) that is utilized to determine the coherent demodulation channel estimate, and the sliding window filter 208' is a "differential" filter which is utilized in conjunction with the common mode filter output to extract the even and odd channel estimates. In another embodiment, the exemplary receiving device utilizes an even sliding filter and an odd sliding filter, wherein the sum of the outputs of these filters is utilized to extract the coherent demodulation channel estimate. The even sliding filter and the odd sliding filter are utilized to extract the even and odd channel estimates.

For the alternate embodiment, define $w_{delta}$ as follows.

$$w_{delta}(i,j) = w_{even}(i,j) - w_{odd}(i,j)$$

The preferred embodiment transmits this difference vector with a [+1−1] multiplexing (i.e. multiplication by +1 in even slots and −1 in odd slots) and transmits the mean vector w with [+1+1] multiplexing (i.e. always multiply by +1). An alternative embodiment can transmit the difference vector $w_{delta}$ and the data weight vector w using an arbitrary multiplexing technique. The receiver must use the appropriate demultiplexing technique, as is obvious to one skilled in the art.

Figure 12:
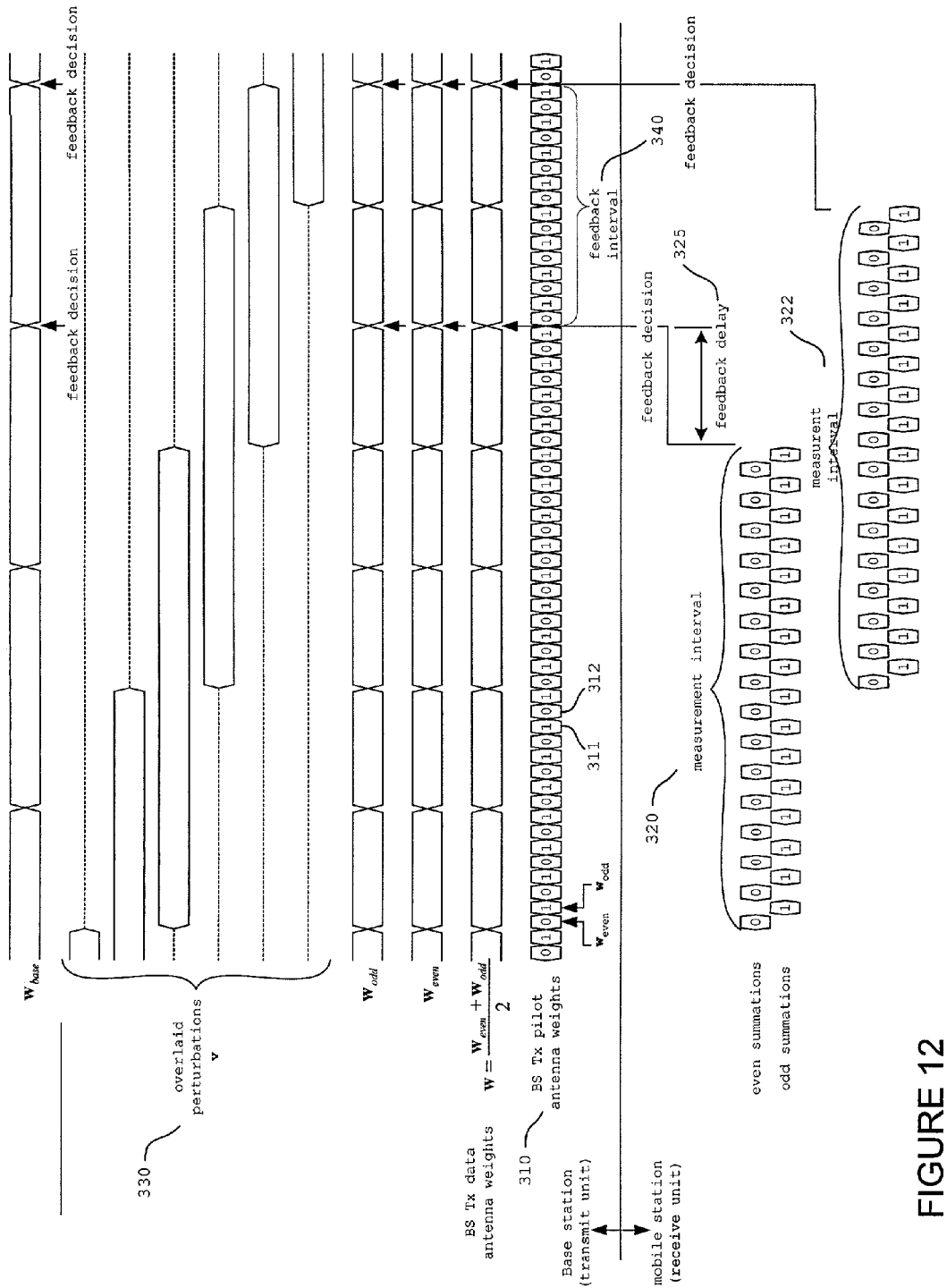
FIG. 12 is a timing diagram that shows an exemplary time line for a TxAA weighting with overlaid perturbation vectors technique.

To facilitate a better understanding of the present inventive technique, an exemplary timing diagram that depicts one exemplary embodiment of the TxAA weighting with overlaid perturbation vectors technique is now described in detail with reference to FIG. 12. FIG. 12 is a timing diagram that shows an exemplary time line for a TxAA weighting with overlaid perturbation vectors technique using the even/odd time slot multiplexing (otherwise described as the multiplexing technique using [+1−1] sequential weighting of the $w_{delta}$ vector and [+1+1] weighting of the w vector). As shown in FIG. 12, the BS Tx pilot antenna weights 310 are transmitted during odd and even time slots (e.g., odd time slot 311 and even time slot 312). In the exemplary embodiment, a feedback interval (e.g., feedback interval 340) comprises 8 even and 8 odd time slots. The overlaid perturbations v 330 comprise a measurement interval (e.g., measurement intervals 320, 322) having 16 even and 16 odd time slots (i.e., twice the length of the feedback interval 340). The feedback delay 325 has a duration of ½ of the feedback interval 340 (i.e., 4 even and 4 odd time slots), and thus the parameter a of the exemplary embodiment is equal to 0.5. This exemplary embodiment is considered a "simple" example of the invention because the measurement interval is only twice the feedback interval.

The TxAA weighting with overlaid perturbation vectors technique of the present invention has been described in the context of a one-bit feedback that represents the time slot (odd or even) that yields a better result. The one-bit feedback is not meant to be a limitation to the present invention as multi-bit feedback can be utilized with the present invention without departing from the scope or spirit of the present invention.

An exemplary multi-bit feedback embodiment of the present overlaid perturbation vectors technique is now described.

An Exemplary Multi-Bit Feedback Embodiment of the Overlaid Perturbation Vectors Technique The exemplary multi-bit feedback embodiment of the TxAA weighting with overlaid perturbation vectors technique of the present invention utilizes multiple simultaneous perturbation vectors. The present exemplary multi-bit feedback embodiment is described below in the context of feedback comprising 2 bits, wherein the feedback represents the best time slot out of up to 4 possible time slots. One skilled in the communication arts shall recognize that more feedback bits such as 3 feedback bits (i.e., best out of up to 8 time slots) can be utilized with the present invention without departing from the scope of the present invention. Also, one skilled in the art will recognize that other multiplexing techniques can be used to transmit multiple independent perturbations such that they can be recovered at the receiver without departing from the scope of the present invention.

The two-bit (2b) feedback embodiment is beneficial when the feedback channel accommodates 2 simultaneous bits better than 2 serial bits even though the overall feedback bit rate remains unchanged. For example, the 2b feedback embodiment can be beneficial when a feedback channel is shared with other fast feedback information (e.g., base station selection, forward rate selection and received signal quality measurements) and may be coded and interleaved. In this example, all information bits should be available and ready for transmission at a framing time.

The multi-bit feedback technique operates in a similar manner as the one-bit feedback technique described above. Thus, upon receipt of the feedback the base station updates the base weight vector to the average of the applied perturbed vectors in the selected time slot. Measurement perturbation scaling $\beta_1$ and update perturbation scaling $\beta_2$ can be applied independently (in a similar manner to the one-bit feedback technique). The data weight vector is updated to equal the mean of the applied perturbed weight vectors. In contrast to the one-bit feedback technique, the data weight vector equals the average over a greater number of perturbed vectors.

Figure 13:
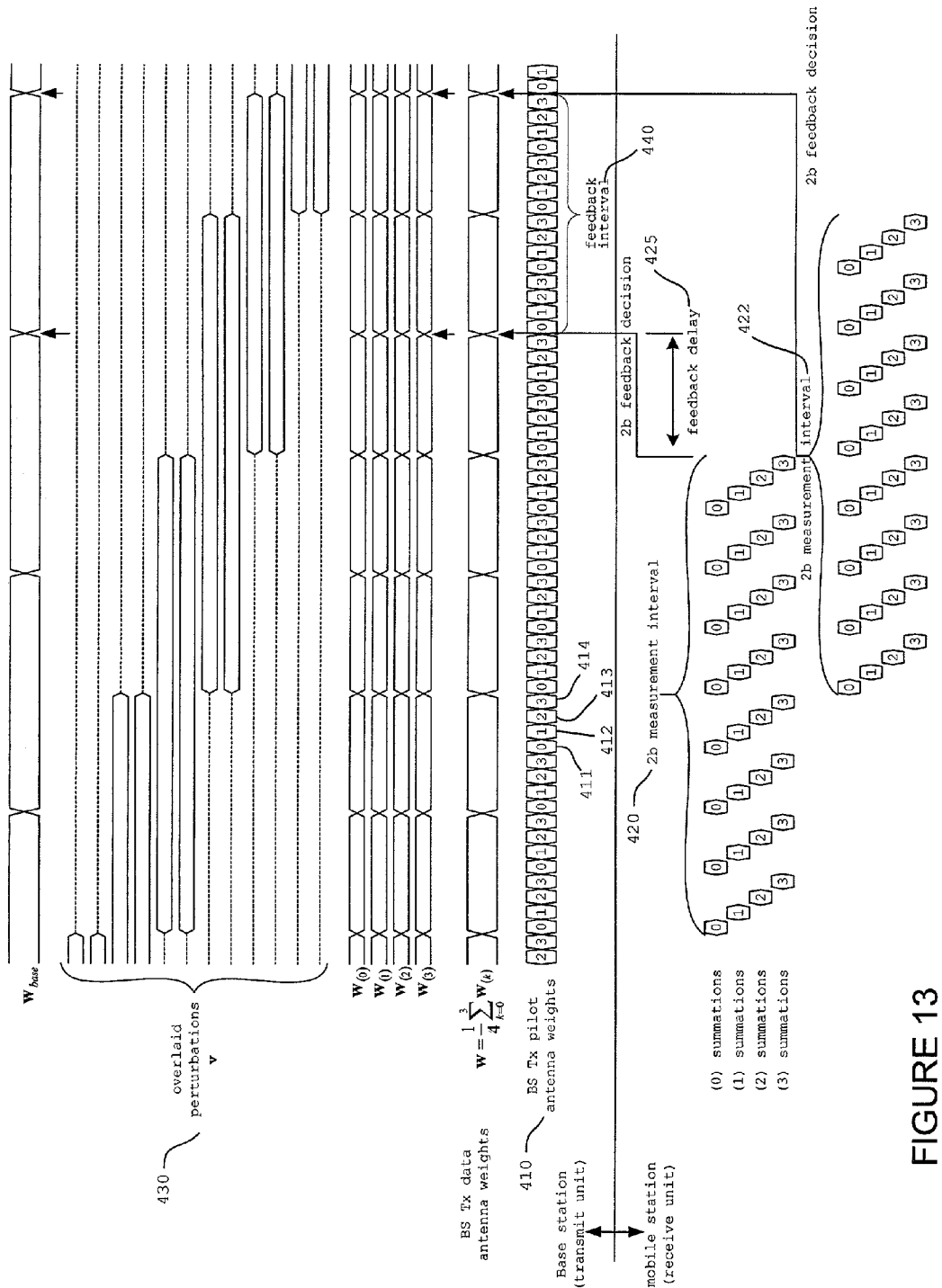
FIG. 13 is a timing diagram that shows an exemplary time line for an exemplary multi-bit feedback embodiment of the present invention.

FIG. 13 is a timing diagram that shows an exemplary time line for an exemplary multi-bit feedback embodiment of the TXAA weighting with overlaid perturbation vectors technique. The exemplary multi-bit feedback embodiment utilizes 2-bit (2b) feedback. As shown in FIG. 13, the 2b feedback technique utilizes 2 simultaneous perturbation vectors 430 and 4 time slots 411, 412, 413, 414. The BS Tx pilot antenna weights 410 are transmitted during the first, second, third or fourth time slots (i.e., time slots 411 412, 413, and 414, respectively). In the exemplary embodiment, a feedback interval (e.g., feedback intervals 440) comprises 4 first time slots, 4 second time slots, 4 third time slots and 4 fourth time slots. The overlaid perturbations v 430 comprise a measurement interval comprising 8 first time slots, 8 second time slots, 8 third time slots and 8 fourth time slots. The feedback delay 425 has a duration of ¼ of the feedback interval 440 (i.e., 8 time slots).

SUMMARY

The transmit adaptive antenna weighting with overlaid perturbation vectors technique allows a communication system to reduce transmit power that is associated with dedicated pilot signals by overlaying perturbation vectors and measuring channel estimates and demodulation channel estimates during a measurement time interval that comprises a plurality of feedback time intervals. The longer measurement duration provides the same measurement accuracy for a lower transmission power. The present inventive method utilizes channel estimates that include the effects of previous perturbation vectors, subsequent feedback vectors and intermediate feedback decisions. The inventive method extracts a coarse gradient estimate by utilizing a continuous summation of OWVP vectors and updates the weighting vector accordingly.

The method and apparatus of the present invention reduces signal degradation and interference in a wireless communication system. Specifically, the present inventive method reduces the amount of transmit power or energy that is associated with a dedicated pilot of a communication system.

A number of embodiments of the present invention have been described. Nevertheless, it will be understood that various modifications may be made without departing from the spirit and scope of the invention. For example, the weight vector update can be performed by the TxAA algorithm or another feedback algorithm that comprises one-bit feedback or multi-bit feedback.

Accordingly, it is to be understood that the invention is not to be limited by the specific illustrated embodiment, but only by the scope of the appended claims.

What is claimed is:

1. A method of applying overlaid perturbation vectors for gradient feedback transmit antenna array adaptation in a communication system, wherein the communication system includes a transmitter and a receiver, and wherein the transmitter includes a plurality of antennae, comprising the steps of:
   a) overlaying at least one weight vector perturbation vector;
   b) measuring signals transmitted in accordance with multiple weight vector perturbation vectors during a measurement interval, wherein the measurement interval has a greater duration than a feedback interval;
   c) generating a feedback based on the measurements of step (b);
   d) determining a new weight vector perturbation vector based on the feedback generated in the step (c); and
   e) returning to the step (a);

wherein, at a time i, an even weight vector $w_{even}(i)$, an odd weight vector $w_{odd}(i)$, and a data weight vector $w(i)$, are represented by the following equations in which $w_{base}(i)$ at least approximates a preceding weight vector, $\beta$ comprises an algorithm parameter, $I$ comprises a number of time periods, and $v(k)$ comprises a perturbation vector:

$$\text{i) } w_{even}(i) = \frac{w_{base}(i) + \beta \|w_{base}(i)\| \cdot \sum_{k=i-I+1}^{i} v(k)}{\left\| w_{base}(i) + \beta \|w_{base}(i)\| \cdot \sum_{k=i-I+1}^{i} v(k) \right\|};$$

$$\text{ii) } w_{odd}(i) = \frac{w_{base}(i) - \beta \|w_{base}(i)\| \cdot \sum_{k=i-I+1}^{i} v(k)}{\left\| w_{base}(i) - \beta \|w_{base}(i)\| \cdot \sum_{k=i-I+1}^{i} v(k) \right\|}; \text{ and}$$

$$\text{iii) } w(i) = \frac{w_{even}(i) + w_{odd}(i)}{2}.$$

2. The method of applying overlaid perturbation vectors as defined in claim 1, wherein step (c) comprises generating at least one feedback bit per feedback interval.

3. The method of applying overlaid perturbation vectors as defined in claim 1, wherein the communication system comprises a DS-CDMA communication system.

4. The method of applying overlaid perturbation vectors as defined in claim 1, wherein the measurement interval is approximately 2 times the feedback interval.

5. The method according to claim 1 wherein the perturbation vectors $v(k)$ have a long term average or statistical autocorrelation given by the following equation:

$$\lim_{k \to \infty} \frac{1}{K} \sum_{k=i}^{i+K-1} v(k) v^H(k) = 2I.$$

6. The method according to claim 5 wherein the parameter $\beta$ defines an adaptation rate.

7. The method of applying overlaid perturbation vectors as defined in claim 1, wherein the step (d) of claim 1 comprises the following sub-steps:
   i) waiting for a new measurement interval and reception of the feedback;
   ii) if the feedback indicates that an even channel yields better results, then determining a base weight utilizing a first equation, else determining the base weight utilizing a second equation; and
   iii) determining new values of the even weight vector, the odd weight vector and the data weight vector.

8. The method of applying overlaid perturbation vectors as defined in claim 7, wherein the first equation is represented by the following equation:

$$w_{base}(i) = \frac{\sum_{k=i-I}^{i-1} w_{even}(k)}{\left\| \sum_{k=i-I}^{i-1} w_{even}(k) \right\|}.$$

9. The method of applying overlaid perturbation vectors as defined in claim 7, wherein the second equation is represented by the following equation:

$$w_{base}(i) = \frac{\sum_{k=i-I}^{i-1} w_{odd}(k)}{\left\|\sum_{k=i-I}^{i-1} w_{odd}(k)\right\|}.$$

10. The method of applying overlaid perturbation vectors as defined in claim 1, wherein the method is capable of independently adjusting a first perturbation size that is applied at transmission during a measurement interval and a second perturbation size applied as an update to a tracked weight vector.

11. The method of applying overlaid perturbation vectors as defined in claim 1, wherein the feedback consists of one bit.

12. The method of applying overlaid perturbation vectors as defined in claim 1, wherein the feedback comprises multiple bits.

13. The method of applying overlaid perturbation vectors as defined in claim 12, wherein the feedback consists of two bits.

14. The method of applying overlaid perturbation vectors as defined in claim 12, wherein the feedback consists of three bits.

15. A method of applying overlaid perturbation vectors for gradient feedback transmit antenna array adaptation in a communication system, wherein the communication system includes a transmitter having a plurality of antennae and a receiver, the method being capable of representing lagged feedback through utilization of multiple indices including a first index and a second index, and comprising steps of:
   a) overlaying at least one weight vector perturbation vector;
   b) measuring signals transmitted in accordance with multiple weight vector perturbation vectors during a measurement interval, wherein the measurement interval has a greater duration than a feedback interval;
   c) generating a feedback based on the measurements of step (b);
   d) determining a new weight vector perturbation vector based on the feedback generated in step (c), including the following sub-steps:
      i) determining a first index base weight, a first index even weight, a first index odd weight and a first index data weight from a first set of equations,
      ii) waiting for the second index to increment, wherein incrementing the second index indicates a second state, and;
      iii) if the feedback indicates that an even channel yielded better results, then determining a second index base weight, a second index even weight, a second index odd weight and a second index data weight from a second set of equations, else determining the second index base weight, the second index even weight, the second index odd weight and the second index data weight from a third set of equations; and
   e) returning to step (a).

16. The method of applying overlaid perturbation vectors as defined in claim 15, wherein the second index represents one of two states, wherein a first state represents "before feedback received" and a second state represents "after feedback received".

17. The method of applying overlaid perturbation vectors as defined in claim 15, wherein the first set of equations is represented by the following equations:

$$w_{base}(i,0) = w_{base}(i-1,1);$$

$$v(i) = \text{normalizedtest perturbation function};$$

$$w_{even}(i,0) = \frac{w_{base}(i,0) + \beta_1 \|w_{base}(i,0)\| \sum_{k=i-I+1}^{i} v(k)}{\left\|w_{base}(i,0) + \beta_1 \|w_{base}(i,0)\| \sum_{k=i-I+1}^{i} v(k)\right\|};$$

$$w_{odd}(i,0) = \frac{w_{base}(i,0) - \beta_1 \|w_{base}(i,0)\| \sum_{k=i-I+1}^{i} v(k)}{\left\|w_{base}(i,0) - \beta_1 \|w_{base}(i,0)\|\varsigma \sum_{k=i-I+1}^{i} v(k)\right\|}; \text{ and}$$

$$w(i,0) = \frac{w_{even}(i,0) + w_{odd}(i,0)}{2},$$

in which, at a time i, $w_{even}(i, 0)$ comprises an even weight vector, $w_{odd}(i, 0)$ comprises an odd weight vector, $w(i, 0)$ comprises a data weight vector, $w_{base}(i, 0)$ at least approximates a preceding weight vector, $v(k)$ comprises a perturbation vector, $\beta_1$ comprises an algorithm parameter, and I comprises a number of time periods.

18. The method of applying overlaid perturbation vectors as defined in claim 15, wherein the second set of equations is represented by the following equations:

$$w_{base}(i,1) = \frac{w_{base}(i,0) + \frac{\beta_2}{\beta_1}\left(\frac{1}{I}\sum_{k=i-I}^{i-1}(\alpha w_{even}(k,0) + (1-\alpha)w_{even}(k-1,1)) - w_{base}(i,0)\right)}{\left\|w_{base}(i,0) + \frac{\beta_2}{\beta_1}\left(\frac{1}{I}\sum_{k=i-I}^{i-1}(\alpha w_{even}(k,0) + (1-\alpha)w_{even}(k-1,1)) - w_{base}(i,0)\right)\right\|};$$

$$w_{even}(i,1) = \frac{w_{base}(i,1) + \beta_1 \|w_{base}(i,1)\| \sum_{k=i-I+1}^{i} v(k)}{\left\|w_{base}(i,1) + \beta_1 \|w_{base}(i,1)\| \sum_{k=i-I+1}^{i} v(k)\right\|};$$

$$w_{odd}(i,1) = \frac{w_{base}(i,1) - \beta_1 \|w_{base}(i,1)\| \cdot \sum_{k=i-I+1}^{i} v(k)}{\left\|w_{base}(i,1) - \beta_1 \|w_{base}(i,1)\| \cdot \sum_{k=i-I+1}^{i} v(k)\right\|}; \text{ and}$$

$$w(i,1) = \frac{w_{even}(i,1) + w_{odd}(i,1)}{2},$$

in which, at a time i, $w_{base}(i, 1)$ and $w_{base}(i, 0)$ at least approximate preceding weight vectors, $w_{even}(k, 0)$, $w_{even}(k-1, 1)$, and $w_{even}(i, 1)$ comprise even weight vectors, $w_{odd}(i, 1)$ comprises an odd weight vector, $w(i, 1)$ comprises a data weight vector, $v(k)$ comprises a perturbation vector, $\beta_1$ and $\beta_2$ comprise algorithm parameters, and I comprises a number of time periods.

19. The method of applying overlaid perturbation vectors as defined in claim 15, wherein the third set of equations is represented by the following equations:

$$w_{base}(i, 1) = \frac{w_{base}(i, 0) + \frac{\beta_2}{\beta_1}\left(\frac{1}{I}\sum_{k=i-I}^{i-1}(\alpha w_{odd}(k, 0) + (1-\alpha)w_{odd}(k-1, 1)) - w_{base}(i, 0)\right)}{\left\|w_{base}(i, 0) + \frac{\beta_2}{\beta_1}\left(\frac{1}{I}\sum_{k=i-I}^{i-1}(\alpha w_{odd}(k, 0) + (1-\alpha)w_{odd}(k-1, 1)) - w_{base}(i, 0)\right)\right\|}$$

$$w_{even}(i, 1) = \frac{w_{base}(i, 1) + \beta_1 \|w_{base}(i, 1)\| \sum_{k=i-I+1}^{i} v(k)}{\left\|w_{base}(i, 1) + \beta_1 \|w_{base}(i, 1)\| \sum_{k=i-I+1}^{i} v(k)\right\|};$$

$$w_{odd}(i, 1) = \frac{w_{base}(i, 1) - \beta_1 \|w_{base}(i, 1)\| \sum_{k=i-I+1}^{i} v(k)}{\left\|w_{base}(i, 1) - \beta_1 \|w_{base}(i, 1)\| \sum_{k=i-I+1}^{i} v(k)\right\|}; \text{ and}$$

$$w(i, 1) = \frac{w_{even}(i, 1) + w_{odd}(i, 1)}{2},$$

in which, at a time $i$, $w_{base}(i, 1)$ and $w_{base}(i, 0)$ at least approximate preceding weight vectors, $w_{odd}(k, 0)$, $w_{odd}(k-1, 1)$, and $w_{odd}(i, 1)$ comprise odd weight vectors, $w_{even}(i, 1)$ comprises an even weight vector, $w(i, 1)$ comprises a data vector, $v(k)$ comprises a perturbation vector, $\beta_1$ and $\beta_2$ comprise algorithm parameters, and $I$ comprises a number of time periods.

20. A method of applying overlaid perturbation vectors for gradient feedback transmit antenna array adaptation in a communication system, wherein the communication system includes a transmitter having a plurality of antennae and a receiver, the method being capable of representing lagged feedback through utilization of multiple indices including a first index and a second index, and comprising the steps of:

a) overlaying at least one weight vector perturbation vector;

b) measuring signals transmitted in accordance with multiple weight vector perturbation vectors during a measurement interval, wherein the measurement interval has a greater duration than a feedback interval;

c) generating a feedback based on the measurements of step (b);

d) determining a new weight vector perturbation vector based on the feedback generated in step (c), including the following sub-steps:

i) determining a set of transmission weights according to a first set of equations, wherein the set of transmission weights are applied prior to receipt of feedback as indicated by a second index, ii) waiting for receipt of feedback, iii) if the feedback indicates that an even channel yielded better results, then updating the set of transmission weights according to a second set of equations, iv) if the feedback indicates that an odd channel yielded better results, then updating the set of transmission weights according to a third set of equations, and v) applying the updated set of transmission weights after receipt of feedback as indicated by the second index; and e) returning to step (a).

* * * * *

UNITED STATES PATENT AND TRADEMARK OFFICE
CERTIFICATE OF CORRECTION

PATENT NO. : 7,180,956 B1
APPLICATION NO. : 10/076925
DATED : February 20, 2007
INVENTOR(S) : Brian C. Banister Page 1 of 1

It is certified that error appears in the above-identified patent and that said Letters Patent is hereby corrected as shown below:

Column 26, Claim 1, Line 1, "(a);" should read --(a) and applying the new weight vector perturbation vector for gradient feedback transmit antenna array adaptation in the communication system;--.

Column 27, Claim 15, Line 65, "(a)." should read --(a) and applying the new weight vector perturbation vector for gradient feedback transmit antenna array adaptation in the communication system.--.

Column 30, Claim 20, Line 34, "(a)." should read --(a) and applying the new weight vector perturbation vector for gradient feedback transmit antenna array adaptation in the communication system.--.

On front page of patent grant, in the Related U.S. Application Data, no. (63) reads "Continuation-in-part of application No. 09/632,081, filed on Aug. 2, 2000, application No. 10/076,925." should read --Continuation-in-part of application No. 09/632,081, filed on Aug. 2, 2000.--

Signed and Sealed this

Sixth Day of November, 2007

JON W. DUDAS
*Director of the United States Patent and Trademark Office*